United States Patent
Wei et al.

(10) Patent No.: US 11,865,449 B2
(45) Date of Patent: Jan. 9, 2024

(54) VIRTUAL OBJECT CONTROL METHOD, APPARATUS, DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Jiacheng Wei, Shenzhen (CN); Shandong Su, Shenzhen (CN); Kang Zhang, Shenzhen (CN); Xun Hu, Shenzhen (CN); Yulin Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/746,673

(22) Filed: May 17, 2022

(65) Prior Publication Data
US 2022/0362672 A1   Nov. 17, 2022

Related U.S. Application Data

(63) Continuation of application No. PCT/CN2021/125430, filed on Oct. 21, 2021.

(30) Foreign Application Priority Data

May 14, 2021 (CN) .......................... 202110526815.3

(51) Int. Cl.
*A63F 13/56* (2014.01)
*A63F 13/537* (2014.01)

(52) U.S. Cl.
CPC ............ *A63F 13/56* (2014.09); *A63F 13/537* (2014.09)

(58) Field of Classification Search
CPC .............................. A63F 13/56; A63F 13/537
See application file for complete search history.

(56) References Cited

U.S. PATENT DOCUMENTS

| 2004/0157662 | A1* | 8/2004 | Tsuchiya | A63F 13/5378 463/32 |
| 2006/0258453 | A1* | 11/2006 | Kando | A63F 13/45 463/36 |

(Continued)

FOREIGN PATENT DOCUMENTS

| CN | 104898953 A | 9/2015 |
| CN | 105194871 A | 12/2015 |

(Continued)

OTHER PUBLICATIONS

Taiwan Intellectual Property Office Examination report for Application No. 110142102 dated Jul. 5, 2022 15 pages.

(Continued)

*Primary Examiner* — Steve Rowland
(74) *Attorney, Agent, or Firm* — ANOVA LAW GROUP PLLC

(57) ABSTRACT

Provided are a virtual object control method, apparatus, device, and computer-readable storage medium, belonging to the field of computer technologies. The method includes controlling a first virtual object to cast a first skill in response to a first operation on a first skill control, wherein the first virtual object moves from a first position to a second position when casting the first skill; obtaining a second operation on a second skill control during casting of the first skill by the first virtual object; displaying a skill casting indicator of a second skill based on the second position for the second operation, the skill casting indicator indicating an influence range of the second skill; and controlling the first virtual object to cast the second skill at the second position (Continued)

according to the influence range after the first virtual object completes casting of the first skill.

18 Claims, 10 Drawing Sheets

(56) References Cited

U.S. PATENT DOCUMENTS

| | | | |
|---|---|---|---|
| 2006/0287027 A1* | 12/2006 | Hardisty | A63F 13/10 |
| | | | 463/8 |
| 2007/0270215 A1* | 11/2007 | Miyamoto | A63F 13/525 |
| | | | 463/32 |
| 2008/0214304 A1* | 9/2008 | Castle | A63F 13/45 |
| | | | 463/36 |
| 2009/0143141 A1* | 6/2009 | Wells | G07F 17/3239 |
| | | | 463/37 |
| 2009/0181736 A1* | 7/2009 | Haigh-Hutchinson | |
| | | | A63F 13/10 |
| | | | 463/2 |
| 2009/0325660 A1* | 12/2009 | Langridge | A63F 13/42 |
| | | | 463/2 |
| 2011/0092284 A1* | 4/2011 | Kando | A63F 13/426 |
| | | | 463/31 |
| 2012/0322523 A1* | 12/2012 | Woodard | A63F 13/69 |
| | | | 463/2 |
| 2013/0196767 A1* | 8/2013 | Garvin | A63F 13/56 |
| | | | 463/36 |
| 2015/0157932 A1* | 6/2015 | Kwon | G06F 3/0488 |
| | | | 463/31 |
| 2015/0258439 A1* | 9/2015 | Prosin | A63F 13/00 |
| | | | 463/31 |
| 2016/0129345 A1* | 5/2016 | Seok | A63F 13/213 |
| | | | 463/31 |
| 2016/0343211 A1 | 11/2016 | Graboyes Goldman et al. | |
| 2017/0291108 A1 | 10/2017 | Kim | |
| 2017/0340959 A1 | 11/2017 | Tang et al. | |
| 2018/0147488 A1* | 5/2018 | Tang | A63F 13/2145 |
| 2019/0391676 A1 | 12/2019 | Wang | |
| 2021/0138351 A1 | 5/2021 | Yu | |
| 2022/0023762 A1 | 1/2022 | Li et al. | |
| 2022/0032191 A1 | 2/2022 | Wei et al. | |
| 2022/0040578 A1 | 2/2022 | Hu et al. | |
| 2022/0080316 A1* | 3/2022 | Huang | A63F 13/822 |

FOREIGN PATENT DOCUMENTS

| | | |
|---|---|---|
| CN | 105677334 A | 6/2016 |
| CN | 111249730 A | 6/2020 |
| CN | 111589142 A | 8/2020 |
| CN | 111672127 A | 9/2020 |
| CN | 112604305 A | 4/2021 |
| CN | 113134232 A | 7/2021 |
| JP | 2006314349 A | 11/2006 |
| JP | 2018517449 A | 7/2018 |
| JP | 2020036907 A | 3/2020 |
| TW | 201703826 A | 2/2017 |
| WO | 2021043000 A1 | 3/2021 |

OTHER PUBLICATIONS

The World Intellectual Property Organization (WIPO) International Search Report for PCT/CN2021/125430 dated Jan. 27, 2022 7 Pages (including translation).

The Japan Patent Office (JPO) Notification of Reasons for Refusal for Application No. 2022-555148 and Translation Jul. 10, 2023 8 Pages.

IP Australia Examination report No. 2 for Application No. 2021376721 dated May 12, 2023 5 pages.

China National Intellectual Property Administration (CNIPA) Office Action 1 for 202110526815.3 dated Oct. 24, 2022 13 Pages (including translation).

"Bilibili", "A white coat", Apr. 12, 2021 (Apr. 12, 2021).

Marco Polo-Skills Descriptions [ENG]—Honor of Kings [Wangzhe Rongyao] [viewed on internet on May 12, 2023] < URL: https://www.youtube.com/watch?v=e1PtNhrKn8E>, published Nov. 30, 2020.

* cited by examiner

VIRTUAL OBJECT CONTROL METHOD, APPARATUS, DEVICE, AND COMPUTER-READABLE STORAGE MEDIUM

RELATED APPLICATIONS

This application is a continuation application of PCT Application No. PCT/CN2021/125430, filed on Oct. 21, 2021, which in turn claims priority to Chinese Patent Application No. 202110526815.3, filed on May 14, 2021, and entitled "VIRTUAL OBJECT CONTROL METHOD, APPARATUS, DEVICE, AND COMPUTER-READABLE STORAGE MEDIUM." The two applications are incorporated herein by reference in their entirety.

FIELD OF THE TECHNOLOGY

Embodiments of this application relate to the field of computer technologies, and in particular, to a virtual object control method, apparatus, device, and computer-readable storage medium.

BACKGROUND OF THE DISCLOSURE

Multiplayer online games such as Multiplayer Online Battle Arena (MOBA) games are increasingly popular among users.

For multiplayer online games, the ability to control the game is a key factor to attract users.

Therefore, it is necessary to provide a virtual object control method, to improve the accuracy of control of a first virtual object.

SUMMARY

Embodiments of this application provide a virtual object control method, apparatus, device, and computer-readable storage medium, to solve the problem of low accuracy of control of a first virtual object in the related art. The technical solutions are as follows.

One aspect of the embodiments of this application provides a virtual object control method, executed by an electronic device. The method includes controlling a first virtual object to cast a first skill in response to a first operation on a first skill control, wherein the first virtual object moves from a first position to a second position when casting the first skill; obtaining a second operation on a second skill control during casting of the first skill by the first virtual object; displaying a skill casting indicator of a second skill based on the second position for the second operation, the skill casting indicator indicating an influence range of the second skill; and controlling the first virtual object to cast the second skill at the second position according to the influence range after the first virtual object completes casting of the first skill.

Another aspect of the embodiments of this application provides a virtual object control apparatus. The apparatus includes a control unit, configured to control a first virtual object to cast a first skill in response to a first operation on a first skill control, wherein the first virtual object moves from a first position to a second position when casting the first skill; an obtaining unit, configured to obtain a second operation on a second skill control during casting of the first skill by the first virtual object; and a display unit, configured to display a skill casting indicator of a second skill based on the second position for the second operation, the skill casting indicator indicating an influence range of the second skill, the control unit being further configured to control the first virtual object to cast the second skill at the second position according to the influence range after the first virtual object completes casting the first skill.

Another aspect of the embodiments of this application provides a non-transitory computer-readable storage medium is further provided, storing at least one program code, the at least program code being loaded and executed by a processor to cause a computer to implement the virtual object control method according to any one of the above aspects.

In the technical solution provided by the embodiments of this application, after the second operation on the second skill control is obtained during casting of the first skill by the first virtual object, the skill casting indicator of the second skill is displayed based on the second position, the skill casting indicator indicating an influence range of the second skill. Therefore, this method can predetermine the influence range of the second skill at the second position. After the casting of the first skill by the first virtual object is complete, the second skill is cast at the second position according to the influence range, so that the position at which the second skill is aimed and the position at which the second skill is cast are the same position. The second skill cast in this method can attack an object that is within the influence range, thereby improving the accuracy of control of the first virtual object.

DESCRIPTION OF EMBODIMENTS

To make the objectives, technical solutions, and advantages of this application clearer, the following further describes implementations of this application in detail with reference to the accompanying drawings.

For convenience of understanding, terms involved in the embodiments of this application are introduced first.

A virtual scene is a scene displayed (or provided) when an application runs on a terminal. The virtual scene refers to a scene created for a virtual object to perform activities. The virtual scene may be a two-dimensional virtual scene, a 2.5-dimensional virtual scene, a three-dimensional virtual scene, etc. The virtual scene may be a simulated scene of the real world, or may be a semi-simulated semi-fictional scene, or may be an entirely fictional scene. For example, in the embodiments of this application, the virtual scene is a three-dimensional virtual scene. For example, the virtual scene may also be referred to as a virtual environment.

Virtual object: A virtual object is a movable object in a virtual scene. The movable object may be a virtual character, a virtual animal, or a cartoon character. An interaction object may control a virtual object by using a peripheral component or tapping a touch display. Each virtual object has a shape and a volume in the virtual scene, and occupies some space in the virtual scene. For example, when the virtual scene is a three-dimensional virtual scene, the virtual object is a three-dimensional model created based on a skeletal animation technology.

Figure 1:
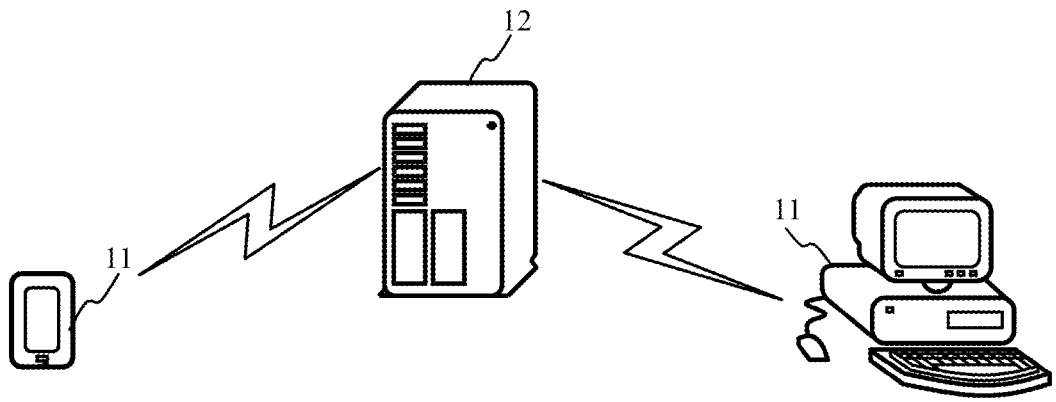
FIG. 1 is a schematic diagram of an implementation environment of a virtual object control method according to an embodiment of this application.

An embodiment of this application provides a virtual object control method. FIG. 1 is a schematic diagram of an implementation environment of a virtual object control method according to an embodiment of this application. Referring to FIG. 1, The implementation environment includes a terminal 11 and a server 12.

An application capable of providing a virtual scene is installed on the terminal 11. The terminal 11 can control a first virtual object to cast a first skill based on a first operation on a first skill control; obtain a second operation on a second skill control during casting of the first skill by the first virtual object; display a skill casting indicator of a second skill based on the second position in response to the second operation; and control the first virtual object to cast the second skill at the second position according to the influence range.

The type of the application capable of providing a virtual scene is not limited in the embodiments of this application. For example, the application capable of providing a virtual scene may be a game application, e.g., a third-person shooter (TPS) game, a first-person shooter (FPS) game, a multiplayer online battle arena (MOBA) game, a multiplayer gunfight survival game, a battle royale shooting game, etc. In one embodiment, the game application involved in the embodiments of this application is a frame synchronization-based game application, that is, the virtual object control method provided in the embodiments of this application can be applied to a frame synchronization-based game application.

In addition to the game application, the application capable of providing a virtual scene may also be applications of other types, e.g., a virtual reality (VR) application, an augmented reality (AR) application, a three-dimensional map application, a military simulation application, a social application, an interactive entertainment application, etc.

The server 12 is configured to provide a backend service for the application capable of providing a virtual scene that is installed on the terminal 11. In one embodiment, the server 12 is responsible for primary computing work, and the terminal 11 is responsible for secondary computing work; or the server 12 is responsible for secondary computing work, and the terminal 11 is responsible for primary computing work; or a distributed computing architecture is adopted between the server 12 and the terminal 11 to perform collaborative computing.

In one embodiment, the terminal 11 is any electronic product that can perform human-machine interaction with the user through one or more methods such as a keyboard, a touch panel, a touch screen, a remote control, voice interaction, or a handwriting device. For example, the terminal 11 is a mobile phone, a smartphone, a personal digital assistant (PDA), a wearable device, a pocket PC (PPC), a tablet computer, a smart in-vehicle infotainment system, a smart television, a smart speaker, etc. The server 12 may be one server, a server cluster including a plurality of servers, or a cloud computing service center. The terminal 11 and the server 12 establish a communication connection through a wired or wireless network.

Those skilled in the art may understand that the terminal 11 and the server 12 are merely examples, and other existing or future terminals or servers that are applicable to this application also fall within the scope of protection of this application, and therefore are incorporated herein by reference.

Figure 2:
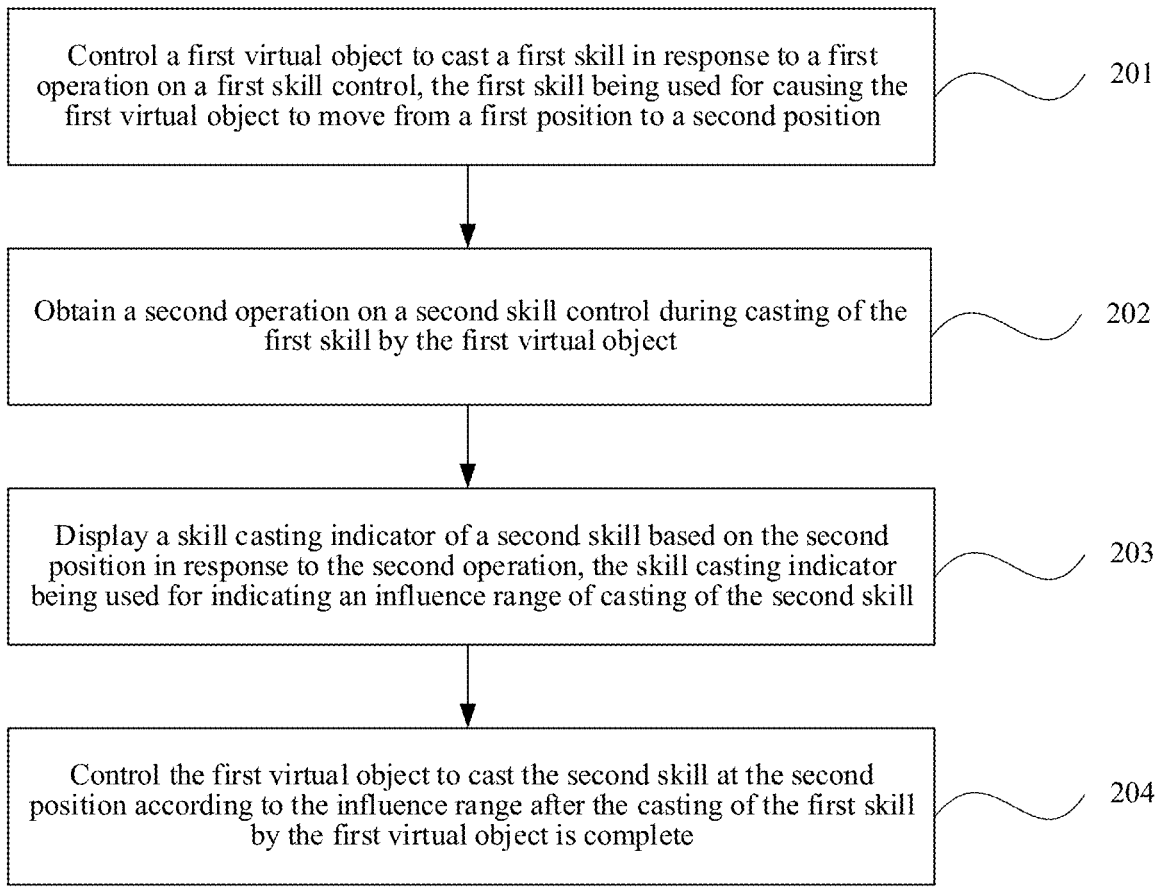
FIG. 2 is a flowchart of a virtual object control method according to an embodiment of this application.

Based on the implementation environment shown in FIG. 1, an embodiment of this application also provides a virtual object control method. This method is executed by an electronic device. The electronic device may be a terminal 11 or a server 12. In this embodiment of this application, the application of the method to the terminal 11 is used as an example. As shown in FIG. 2, the method provided in this embodiment of this application includes the following steps 201 to 204.

Step 201. Control a first virtual object to cast a first skill in response to a first operation on a first skill control, the first skill causing the first virtual object to move from a first position to a second position.

Figure 3:
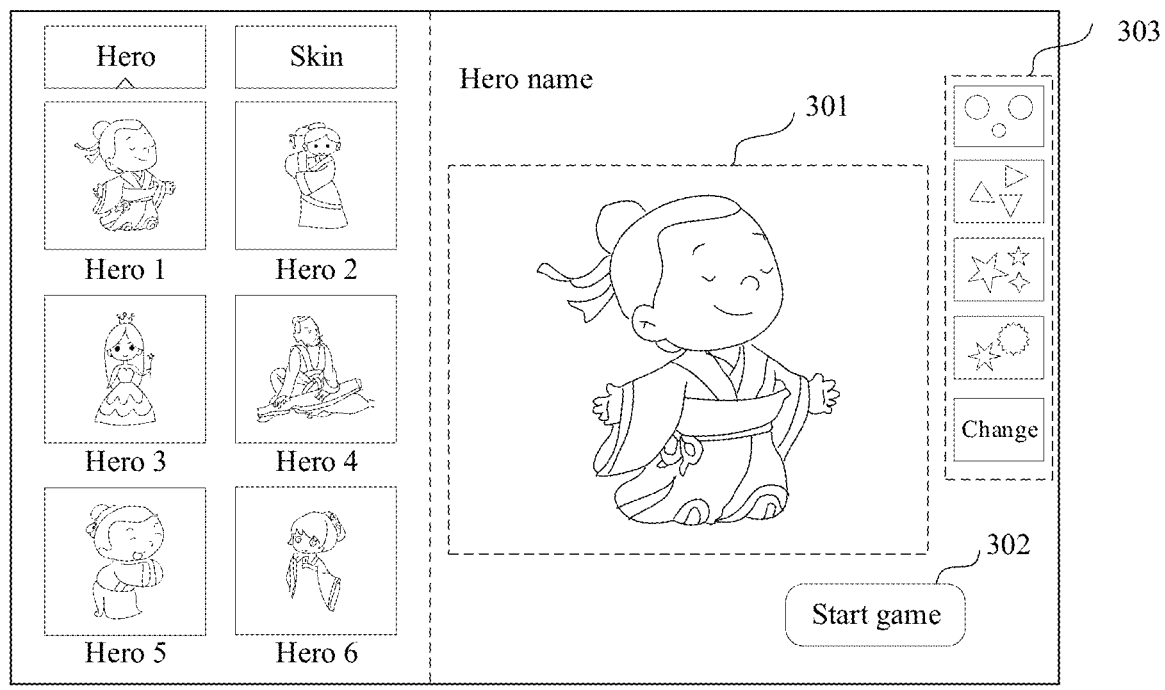
FIG. 3 is a schematic diagram of a display page of an application according to an embodiment of this application.

This embodiment of this application is executed by a terminal, where an application capable of providing a virtual environment (briefly referred to as an application) is installed on the terminal. In response to a click/tap operation performed by the user on an application, the terminal displays a display page of the application, where a plurality of virtual objects are displayed on the display page. The plurality of virtual objects are virtual objects that have been obtained by an account corresponding to the user logged in to the terminal. FIG. 3 is a schematic diagram of a display page of an application according to an embodiment of this application. In FIG. 3, six virtual objects are shown, which are: Hero 1, Hero 2, Hero 3, Hero 4, Hero 5, and Hero 6. The number of virtual objects displayed is not limited in the embodiments of this application. When the number of virtual objects is more than one and the display page is not sufficient to display all the virtual objects, the display page may include a sliding control, which is configured to change the displayed virtual object in response to detecting that the sliding control is slid.

In response to a selection instruction of the user on any virtual object of the plurality of virtual objects, the terminal displays the selected virtual object in an area 301 in FIG. 3.

The selected virtual object is dynamically displayed in the area 301. In response to receiving a selection instruction on a "Start game" control 302, the terminal determines the virtual object selected by the user as the first virtual object. As shown in FIG. 3, in response to the user selecting Hero 1 from the plurality of virtual objects, the terminal dynamically displays Hero 1 in the area 301. FIG. 3 only shows a frame of image that is randomly captured. In actual operations, Hero 1 is dynamically displayed in the area 301. In response to the selection instruction of the user on the "Start game" control 302, the terminal determines Hero 1 as the first virtual object, and displays an operation interface of the first virtual object.

Figure 4:
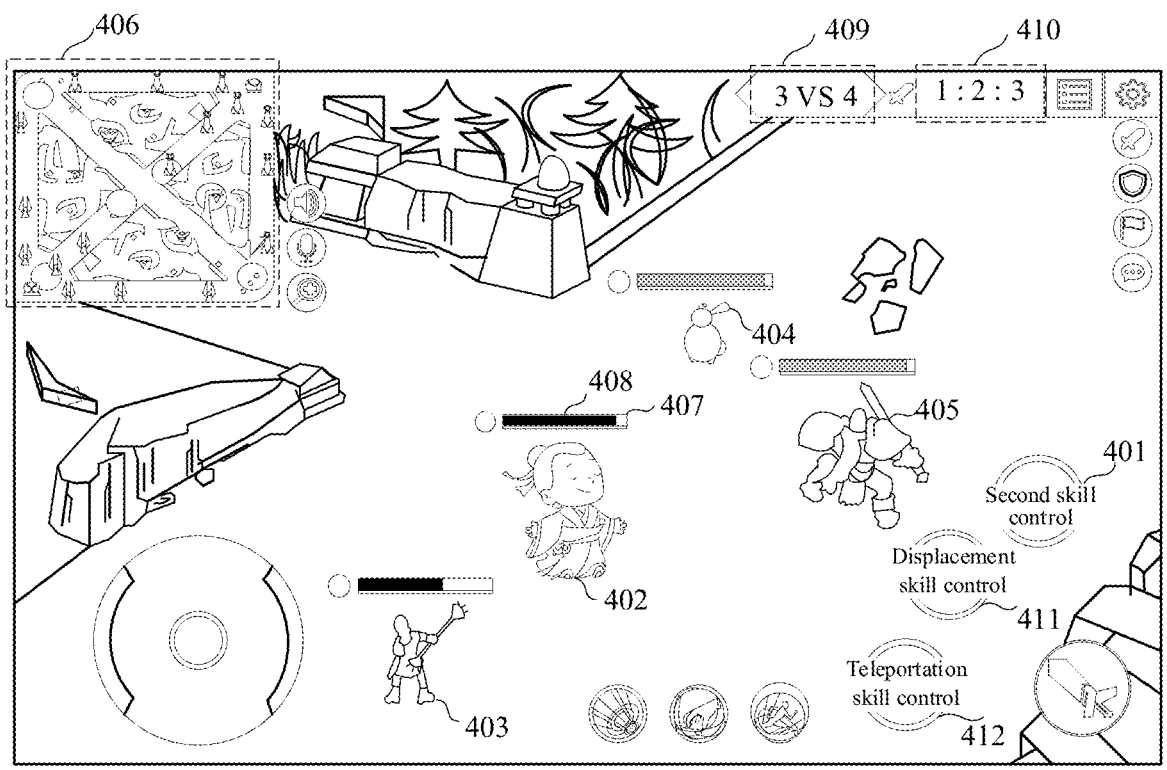
FIG. 4 is a schematic diagram of an operation interface of a first virtual object according to an embodiment of this application.

FIG. 4 is a schematic diagram of an operation interface of a first virtual object according to an embodiment of this application. In the operation interface of FIG. 4, a scene picture of a virtual scene where the first virtual object is located is displayed. The first skill includes a displacement skill and a teleportation skill, and a displacement skill control 411, a teleportation skill control 412, and a second skill control 401 are displayed on the scene picture. The displacement skill control 411 is used for controlling casting of the displacement skill, and the teleportation skill control 412 is used for controlling casting of the teleportation skill. The second skill control 401 is used for controlling casting of a second skill. The second skill is an aiming skill. Both the displacement skill and the teleportation skill are used for moving the first virtual object from the first position to the second position. The first position is a position of the first virtual object when the first skill control is triggered. The second position is a position of the first virtual object when the casting of the first skill is complete.

For example, the controls mentioned in the embodiments of this application may be buttons, triggerable icons, etc., and are not limited in the embodiments of this application. For example, assuming that the controls are buttons, the first skill control is a first skill button, the displacement skill control is a displacement skill button, the teleportation skill control is a teleportation skill button, and the second skill control is a second skill button.

When the first virtual object casts the displacement skill, the movement of the first virtual object from the first position to the second position is visible, that is, an arrival method corresponding to the displacement skill is an arrival method with a movement trajectory. The displacement skill is used for causing the first virtual object to walk from the first position to the second position, or the displacement skill is used for causing the first virtual object to fly from the first position to the second position. When the first virtual object casts the teleportation skill, the movement of the first virtual object from the first position to the second position is invisible, that is, an arrival method corresponding to the teleportation skill is an arrival method without a movement trajectory. The teleportation skill includes either instant teleportation or flash.

In one embodiment, the first operation on the first skill control is an operation of dragging the first skill control. The first skill includes any one of the displacement skill or the teleportation skill. The displacement skill and the teleportation skill cannot be cast at the same time. That is to say, during the casting of the displacement skill in response to the first operation on the displacement skill control, the teleportation skill cannot be cast even if a first operation on the teleportation skill control is received. The first skill control includes the displacement skill control and the teleportation skill control. The controlling of the first virtual object to cast the first skill in response to the first operation on the first skill control may be implemented in either of the following two methods:

Method 1: Control the first virtual object to cast the displacement skill in response to the first operation on the displacement skill control.

In one embodiment, when the first virtual object casts the displacement skill, the second position of the first virtual object after casting the displacement skill is determined by the type of the displacement skill cast by the first virtual object.

In one embodiment, the displacement skill includes any one of an orientation skill, a target point skill, or a follow skill. The controlling of the first virtual object to cast the displacement skill in response to the first operation on the displacement skill control includes the following three cases.

Case 1: Control the first virtual object to cast the orientation skill in response to the type of the displacement skill cast by the first virtual object being the orientation skill.

In one embodiment, the second position of the first virtual object after casting the orientation skill is determined based on the first position and a movement distance and a movement direction corresponding to the orientation skill. For example, the first position may also be referred to as an original position of the first virtual object, that is to say, the second position of the first virtual object after casting the orientation skill is determined based on the original position of the first virtual object and the movement distance and the movement direction corresponding to the orientation skill.

In one embodiment, the process of determining the second position of the first virtual object after casting the orientation skill in response to the first skill cast by the first virtual object being the orientation skill is as follows: determining a movement direction and a movement distance of the first virtual object; and determining the second position of the first virtual object after casting the orientation skill, based on the original position, the movement direction, and the movement distance of the first virtual object.

In one embodiment, the process of determining the movement direction of the first virtual object is as follows: in response to that the displacement skill is the orientation skill and the user continues to drag the displacement skill control, the operation interface of the first virtual object displays a direction with an arrow by using the first virtual object as a starting point, the direction with the arrow changes as the user moves the displacement skill control, the direction is the movement direction of the first virtual object, and when the user releases the displacement skill control, the terminal determines the direction at the moment when the user releases the displacement skill control as the movement direction of the first virtual object.

Figure 5:
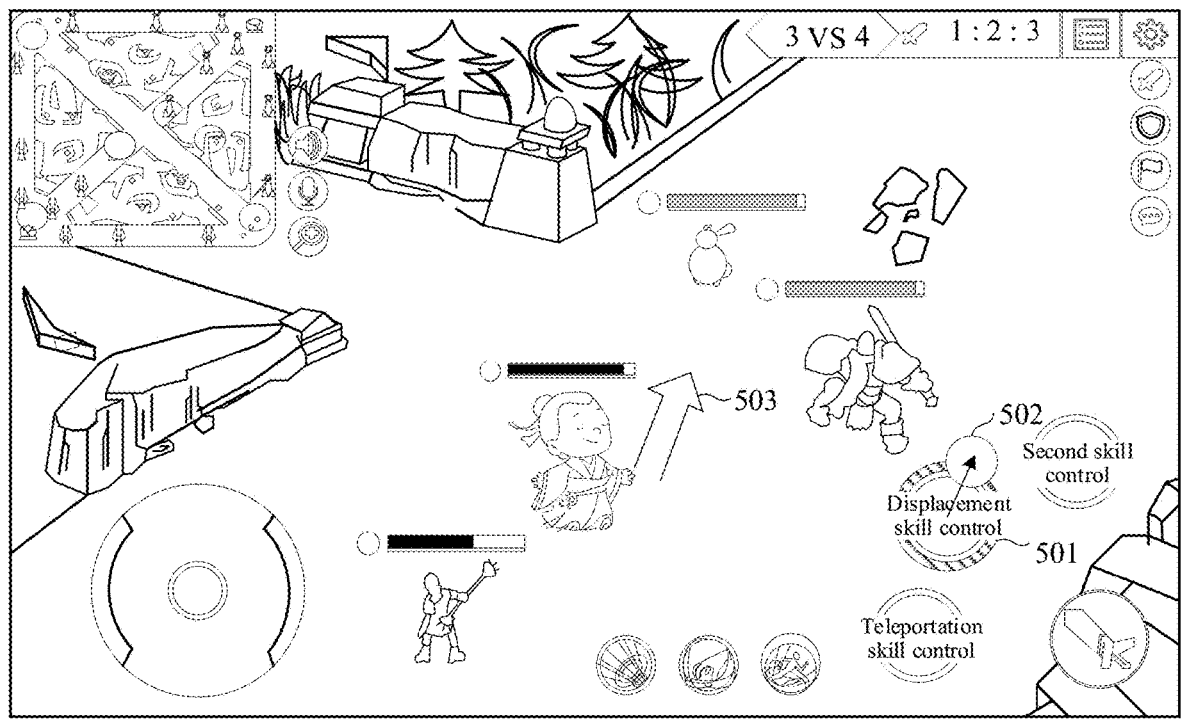
FIG. 5 is a schematic diagram of determining a movement direction of a first virtual object according to an embodiment of this application.

FIG. 5 is a schematic diagram of determining a movement direction of a first virtual object according to an embodiment of this application. In FIG. 5, a control 501 is a displacement skill control, the displacement skill is an orientation skill, a shadow portion appears on the control 501 when the user triggers the control 501, and the shadow portion disappears when the user releases the control 501. When the user drags the control 501, a black arrow 502 is displayed on the control 501. The black arrow 502 is used for indicating a direction in which the first virtual object is to move. When the user is satisfied with the direction, the user releases the control 501 and the terminal displays a movement direction 503 of the first virtual object. When the user is not satisfied with the direction, the user continues to drag the control 501 until a direction that the user is satisfied with appears. Then the user releases the control 501.

In one embodiment, after the movement direction of the first virtual object is determined, the movement distance of the first virtual object needs to be further obtained. A movement distance of each movement of the first virtual object is a fixed value, which set by an application developer during development. Different virtual objects correspond to different movement distances. The terminal obtains the movement distance of the first virtual object based on an object identifier of the first virtual object. Further, the terminal determines the second position of the first virtual object after casting the orientation skill, based on the original position, the movement direction, and the movement distance of the first virtual object.

In one embodiment, the process of determining the second position of the first virtual object after casting the orientation skill based on the original position, the movement direction, and the movement distance of the first virtual object is as follows: determining an initial position based on the original position, the movement distance, and the movement direction of the first virtual object; determining the initial position as the second position of the first virtual object after casting the orientation skill in response to the initial position being valid; and determining the second position of the first virtual object after casting the orientation skill based on the initial position in response to the initial position being invalid.

For example, the process of determining whether the initial position is valid is determining that the initial position is invalid if the initial position satisfies an invalidity condition; and determining that the initial position is valid if the initial position does not satisfy the invalidity condition. The invalidity condition may be flexibly set by the application developer, and is not limited in the embodiments of this application. In some embodiments, the initial position satisfying the invalidity condition means that the initial position exceeds a boundary of the virtual scene, or the initial position is a wall in the virtual scene. That is, if the initial position exceeds a boundary of the virtual scene, the initial position is invalid; if the initial position is a wall in the virtual scene, the initial position is invalid. The initial position is valid in all other cases.

In one embodiment, the process of determining the second position of the first virtual object after casting the orientation skill based on the initial position in response to the initial position being invalid is as follows: determining a target area based on the initial position, and determining any valid position in the target area as the second position of the first virtual object after casting the orientation skill.

For example, the process of determining the target area based on the initial position is determining a target circle using the initial position as a center of a circle and a target length as a radius, and determining an area corresponding to the target circle as the target area. The target length is any length, which is not limited in the embodiments of this application. The shorter the target length, the closer the determined second position of the first virtual object after casting the orientation skill is to the initial position.

Figure 6:
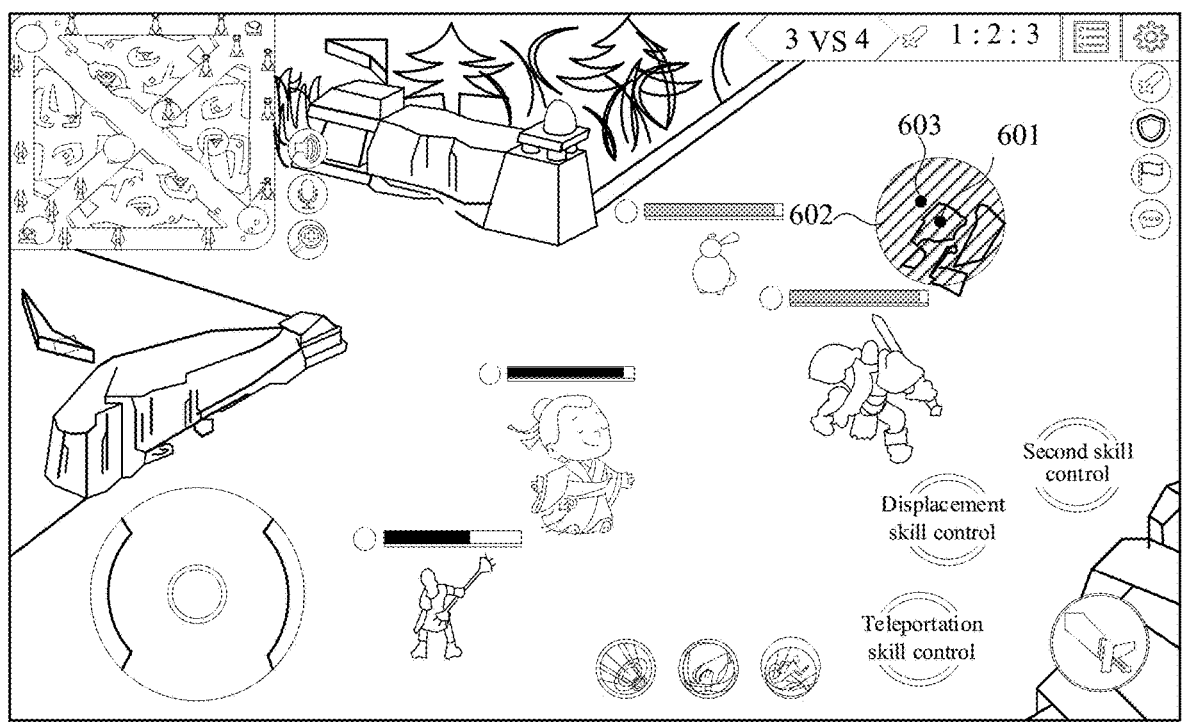
FIG. 6 is a schematic diagram of a process of determining a second position after a first virtual object casts an orientation skill according to an embodiment of this application.

FIG. 6 is a schematic diagram of a process of determining a second position after a first virtual object casts an orientation skill according to an embodiment of this application. In FIG. 6, a position 601 is a determined initial position. Because the initial position is invalid, a target circle 602, i.e., a shadow portion in FIG. 6, is obtained using the initial position as a center of a circle and the target length as a radius, and a position 603 in the target circle is determined as the second position of the first virtual object after casting the orientation skill.

The target area may also be of other shapes, and the circular target area is described in the embodiments of this application by way of example only and is not intended to limit the shape of the target area.

Case 2: Control the first virtual object to cast the target point skill in response to the type of the displacement skill cast by the first virtual object being the target point skill.

In one embodiment, the second position of the first virtual object after casting the target point skill is determined based on a first target point corresponding to the target point skill. For example, a position of the first target point corresponding to the target point skill is determined as the second position of the first virtual object after casting the target point skill. For example, the position of the first target point is a position which is set in advance.

The target point skill is used for moving the first virtual object from the first position to the second position within a first time period and displaying a movement trajectory of the first virtual object. For example, the first position may also be referred to as an original position of the first virtual object. That is to say, the target point skill is used for moving the first virtual object from the original position of the first virtual object to the position of the first target point within the first time period, and the movement process is visible. The movement process being visible means that the movement trajectory of the first virtual object on the operation interface is visible to the user.

A time length of the first time period is any time length, which is not limited in the embodiments of this application. For example, the time length of the first time period is 10 seconds. In another example, the time length of the first time period is 5 seconds.

When the type of the displacement skill is the orientation skill or the target point skill, because the movement process of the first virtual object is visible, it is possible that the first virtual object is blocked or dragged away during the movement process. The first virtual object is controlled to cast the orientation skill or the target point skill, where the second position of the first virtual object after casting the orientation skill or the target point skill is determined based on a position of the first virtual object at a moment at which the first virtual object is blocked during the movement. That is to say, when it is detected that the first virtual object is blocked by a fourth virtual object during the movement process, the position where the first virtual object is blocked is determined as the second position.

Alternatively, the first virtual object is controlled to cast the orientation skill or the target point skill, where the second position of the first virtual object after casting the orientation skill or the target point skill is determined based on a position of a destination point to which the first virtual object is to be dragged. That is to say, when it is detected that the first virtual object is dragged by a fifth virtual object during the movement process, the position of the destination point to which the first virtual object is to be dragged is determined as the second position.

Case 3: Control the first virtual object to cast the follow skill in response to the type of the displacement skill cast by the first virtual object being the follow skill.

In one embodiment, the second position of the first virtual object after casting the follow skill is determined based on a third virtual object followed by the first virtual object.

In one embodiment, in response to the type of the displacement skill cast by the first virtual object is the follow skill, the user needs to determine a third virtual object to follow before triggering the displacement skill control. The third virtual object may be an enemy virtual object or a friend virtual object, which is not limited in the embodiments of this application, but it is necessary to determine that the third virtual object is located in the virtual scene where the first virtual object is located. For example, the process of determining the third virtual object by the user is as follows: the user arbitrarily selects a virtual object from the plurality of virtual objects displayed in the operation interface of the first virtual object, and the terminal determines the virtual object selected by the user as the third virtual object. In response to the terminal receiving the first operation on the displacement skill control, the terminal determines a position of the third virtual object after the first virtual object casts the first skill as the second position of the first virtual object after casting the first skill.

Method 2: Control the first virtual object to cast the teleportation skill in response to the first operation on the teleportation skill control.

In one embodiment, when the first virtual object casts the teleportation skill, the second position of the first virtual object after casting the teleportation skill is determined based on a second target point corresponding to the teleportation skill. For example, a position of the second target point corresponding to the teleportation skill is determined as the second position of the first virtual object after casting the teleportation skill.

The teleportation skill is used for moving the first virtual object from the first position to the second position within a second time period and hiding a movement trajectory of the first virtual object. For example, the first position may also be referred to as an original position of the first virtual object. That is to say, the teleportation skill is used for moving the first virtual object from the original position of the first virtual object to the position of the second target point within the second time period, and the movement process is invisible. The position of the second target point is also a position which is set in advance. That is to say, regardless of where the original position of the first virtual object is, once the user triggers the teleportation skill control, the first virtual object needs to move from the original position to the position of the second target point within the second time period. The movement process being invisible means that the movement trajectory of the first virtual object on the operation interface is not visible to the user.

A time length of the second time period is any time length, which is not limited in the embodiments of this application. For example, the time length of the second time period is 10 seconds. In another example, the time length of the second time period is 5 seconds.

The time length of the first time period and the time length of the second time period may be the same or different, which is not limited in the embodiments of this application. The position of the first target point and the position of the second target point may be the same or different, which is also not limited in the embodiments of this application.

Figure 7:
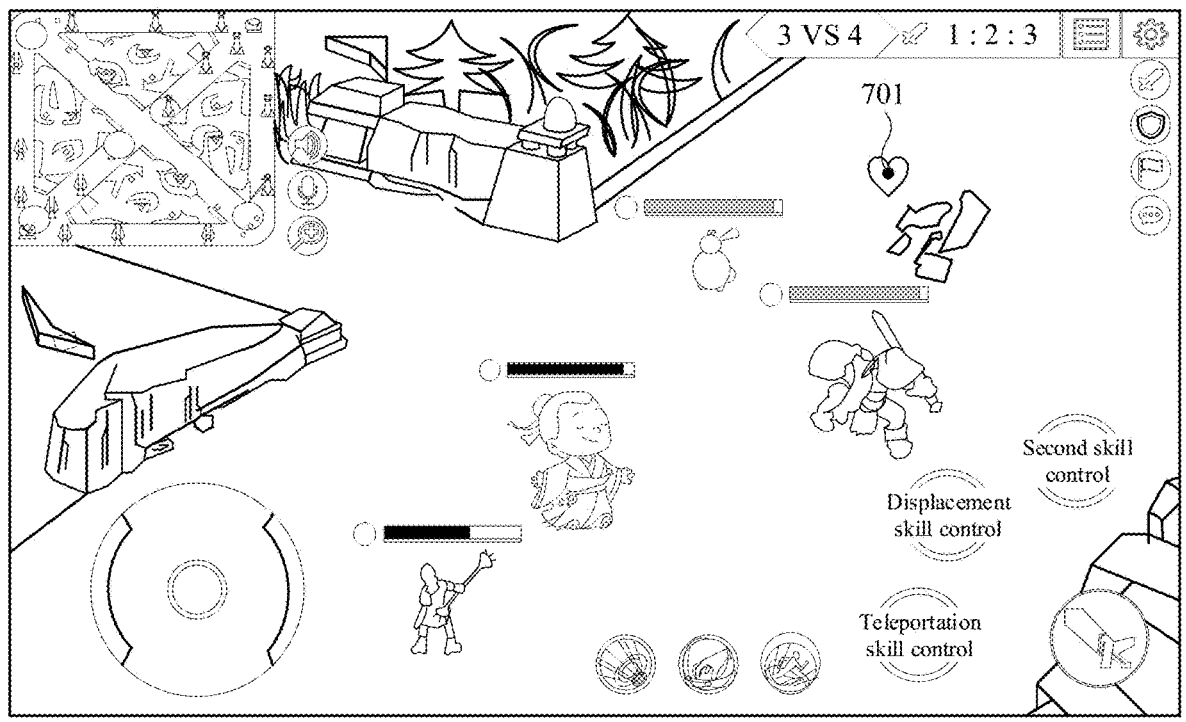
FIG. 7 is a schematic diagram of displaying a second position in a target form according to an embodiment of this application.

In one embodiment, after the second position of the first virtual object after casting the first skill is determined, the second position may further be displayed in a target form, the target form indicating that the second position is a position of the first virtual object after the casting of the first skill by the first virtual object is complete. FIG. 7 is a schematic diagram of displaying the second position in the form of a target according to an embodiment of this application. In FIG. 7, a position 701 is the second position, and the second position is displayed in the form of a heart. The second position may also be displayed in other forms. The heart form in FIG. 7 is merely an example of the target form, and is not intended to limit the target form.

In one embodiment, after the second position is determined, an object may be placed at the second position to indicate that the position is the position where the first virtual object is located after the casting of the first skill is complete. The object may be a virtual object or the like, which is not limited in the embodiments of this application. But the object is not displayed on the operation interface of the first virtual object, that is, the object on the operation interface of the first virtual object is invisible to the user.

In one embodiment, virtual objects in an enemy team and a friend team of the first virtual object are also displayed in the operation interface of the first virtual object, where the friend team is a team to which the first virtual object belongs, and the enemy team is a team to be attacked by the first virtual object. In FIG. 4, 402 is the first virtual object, 403 is a virtual object in the friend team of the first virtual object, and 404 and 405 are virtual objects in the enemy team of the first virtual object. A map of the entire virtual scene is also displayed in the operation interface of the first virtual object. An area 406 in FIG. 4 is a map of the entire virtual scene. In response to a selection operation on the area 406, the displayed map of the virtual scene can be zoomed in, to provide the user with a better gaming experience.

A health bar of each virtual object, i.e., combat power of each virtual object, is also displayed in the operation interface of the first virtual object. Taking the combat power of the first virtual object as an example, 407 in FIG. 4 is used for indicating the total combat power of the first virtual object, and 408 in FIG. 4 is used for indicating the current remaining combat power of the first virtual object. In order to distinguish the friend team from the enemy team, when displaying the combat power of the virtual objects, the combat power of the virtual objects in the friend team is displayed in black, and the combat power of the virtual objects in the enemy team is displayed in gray, so that the user can easily distinguish the friend team from the enemy team. The combat power of the virtual objects in the friend team and the enemy team may also be displayed in other colors. The embodiments of this application are described by using black and gray as an example, but are not limited thereto. The display form of the combat power of the other virtual objects is the same as the display form of the combat power of the first virtual object, which will not be repeated here.

In one embodiment, a battle ratio of the friend team to the enemy team is also displayed in the operation interface of the first virtual object. For example, "3 vs 4" shown in 409 in FIG. 4 is the battle ratio between the friend team and the enemy team. "3 vs 4" displayed in 409 may also be a battle ratio of the enemy team to the friendly team, which is not limited in the embodiments of this application. FIG. 4 also shows a fighting status of the first virtual object. "1:2:3" shown in 410 in FIG. 4 indicates that the first virtual object has killed 1 enemy, has been killed 2 times, and has assisted 3 times.

In one embodiment, after determining the first virtual object, the terminal may further display available equipments of the first virtual object for the user to select. For example, an area 303 in FIG. 3 is an equipment selection area. In this area, an available equipment corresponding to a selected virtual object is displayed. In response to a selection instruction of the user on an available equipment, the terminal determines the available equipment selected by the user as an equipment of the first virtual object.

Step 202. Obtain a second operation on a second skill control during casting of the first skill by the first virtual object.

The second skill control is used for controlling casting of a second skill. The second skill is an aiming skill, and the second skill includes any one of a directional skill, a fan-shaped skill, and a circular skill. The second operation includes, but is not limited to, a click/tap operation. In response to the second skill corresponding to the first virtual object being the directional skill, the terminal controls the first virtual object to release the directional skill after obtaining the second operation on the second skill control; in response to the second skill corresponding to the first virtual object being the fan-shaped skill, the terminal controls the first virtual object to release the fan-shaped skill after obtaining the second operation on the second skill control; in response to the second skill corresponding to the first virtual object being the circular skill, the terminal controls the first virtual object to release the circular skill after obtaining the second operation on the second skill control.

The terminal stores a correspondence between identifiers of virtual objects and types of the second skills corresponding to the virtual objects. After obtaining the second operation on the second skill control, the terminal determines the type of the second skill corresponding to the first virtual object based on the object identifier of the first virtual object. Alternatively, the server stores a correspondence between identifiers of virtual objects and types of the second skills corresponding to the virtual objects. After obtaining the second operation on the second skill control, the terminal generates a first obtaining request, where the first obtaining request carries the object identifier of the first virtual object; and transmits the first obtaining request to the server. After receiving the first obtaining request, the server determines the type of the second skill corresponding to the first virtual object based on the object identifier of the virtual object carried in the first obtaining request. The server transmits the type of the second skill corresponding to the first virtual object to the terminal, so that the terminal obtains the type of the second skill corresponding to the first virtual object.

In one embodiment, during casting of the first skill by the first virtual object, when the first virtual object needs to be controlled to cast the second skill, the second skill control needs to be clicked/tapped. In response to the click/tap operation on the second skill control, the terminal obtains the second operation on the second skill control.

Step 203. Display a skill casting indicator of a second skill based on the second position in response to the second operation, the skill casting indicator indicating an influence range when the second skill is cast.

The skill casting indicator of the second skill is used for visualizing the influence range when the second skill is cast, so that the user can directly observe the influence range when the second skill is cast according to the displayed skill casting indicator of the second skill. In this embodiment of this application, when the second operation is obtained, the skill casting indicator of the second skill is displayed based on the second position. In one embodiment, displaying the skill casting indicator of the second skill based on the second position is: displaying the skill casting indicator of the second skill at a position determined based on the second position.

In one embodiment, the influence range indicated by the skill casting indicator of the second skill is determined using the second position as a reference point. For example, in this case, a position matching the influence range determined with the second position as the reference point is used as the position determined based on the second position, that is, the skill casting indicator of the second skill is displayed at the location matching the influence range determined with the second position as the reference point. For example, the position matching the influence range determined with the second position as the reference point is a position where the influence range determined with the second position as the reference point is located, or is a boundary position of the influence range determined with the second position as the reference point.

In one embodiment, the process of determining the influence range indicated by the skill casting indicator of the second skill is as follows: determining an aiming direction of the second skill by using the second position as a reference point, and determining a coverage range corresponding to the aiming direction as the influence range indicated by the skill casting indicator of the second skill. In this case, a position matching the coverage range corresponding to the aiming direction is used as the position determined based on the second position. For example, a position where the coverage range corresponding to the aiming direction is located is used as the position determined based on the second position, or a boundary position of the coverage area corresponding to the aiming direction is used as the position determined based on the second position. In this case, the skill casting indicator of the second skill is displayed at the position matching the coverage range corresponding to the aiming direction. For example, the aiming direction of the second skill is determined by dragging the second skill control, and a direction toward which the second skill is aimed when the second skill control is released is determined as the aiming direction of the second skill.

In one embodiment, before displaying the skill casting indicator of the second skill based on the second position in response to the second operation, the terminal further needs to determine timing of casting the second skill. If the timing of casting the second skill is after the casting of the first skill by the first virtual object is complete, the terminal determines a second position of the first virtual object after casting the first skill, and displays the skill casting indicator of the second skill based on the second position.

In one embodiment, the terminal may determine the timing of casting the second skill in either of the following two methods:

Method 1: The terminal determines, based on the object identifier of the first virtual object, whether the timing of casting the second skill of the first virtual object is after the casting of the first skill is complete.

In one embodiment, the terminal stores a correspondence between virtual objects and skill casting sequences. Based on the object identifier of the first virtual object, the terminal obtains the skill casting sequence of the first virtual object, and determines, based on the skill casting sequence of the first virtual object, whether the timing of casting the second skill of the first virtual object is after the casting of the first skill is complete.

Method 2: The terminal determines, through the server, whether the timing of casting the second skill of the first virtual object is after the casting of the first skill is complete.

In one embodiment, the terminal generates a second obtaining request, where the second obtaining request carries the object identifier of the first virtual object, and the second obtaining request is used for obtaining a skill casting sequence of the first virtual object. After receiving the second obtaining request, the server parses the second obtaining request to obtain the object identifier of the first virtual object carried in the second obtaining request. The server stores a correspondence between virtual objects and skill casting sequences. Based on the object identifier of the first virtual object and the correspondence, the server determines the skill casting sequence of the first virtual object, and sends the skill casting sequence of the first virtual object to the terminal, so that the terminal obtains the skill casting sequence of the first virtual object. The terminal determines, based on the skill casting sequence of the first virtual object, whether the timing of casting the second skill is after the casting of the first skill is complete.

The skill casting sequence of each virtual object may be set by the application developer during development, or may be set by the user in the application that the user logs in to, which is not limited in the embodiments of this application.

The timing of casting the second skill of the first virtual object may be determined by any of the foregoing methods, which is not limited in the embodiments of this application.

For example, the skill casting sequence of the first virtual object is to cast the skills in sequence according to the triggering timing of the skills, that is, the timing of casting the second skill is after the casting of the first skill is complete. In another example, the skill casting sequence of the first virtual object is to cast a skill immediately when the skill is triggered, that is, the timing of casting the second skill is not after the casting of the first skill is complete.

In one embodiment, when the timing of casting the second skill is after the casting of the first skill by the first virtual object is complete, because the second skill includes any one of the directional skill, the fan-shaped skill, and the circular skill, the skill casting indicator of the second skill displayed based on the second position varies with the type of the second skill, and the influence range indicated by the skill casting indicator also varies. Depending on the type of the second skill, the displaying of the skill casting indicator of the second skill includes the following three cases.

Case 1. For the second skill being the directional skill: Display a skill casting indicator of the directional skill based on the second position in response to the second operation, an influence range indicated by the skill casting indicator of the directional skill being a range covered by an aiming direction determined using the second position as a starting point.

Figure 8:
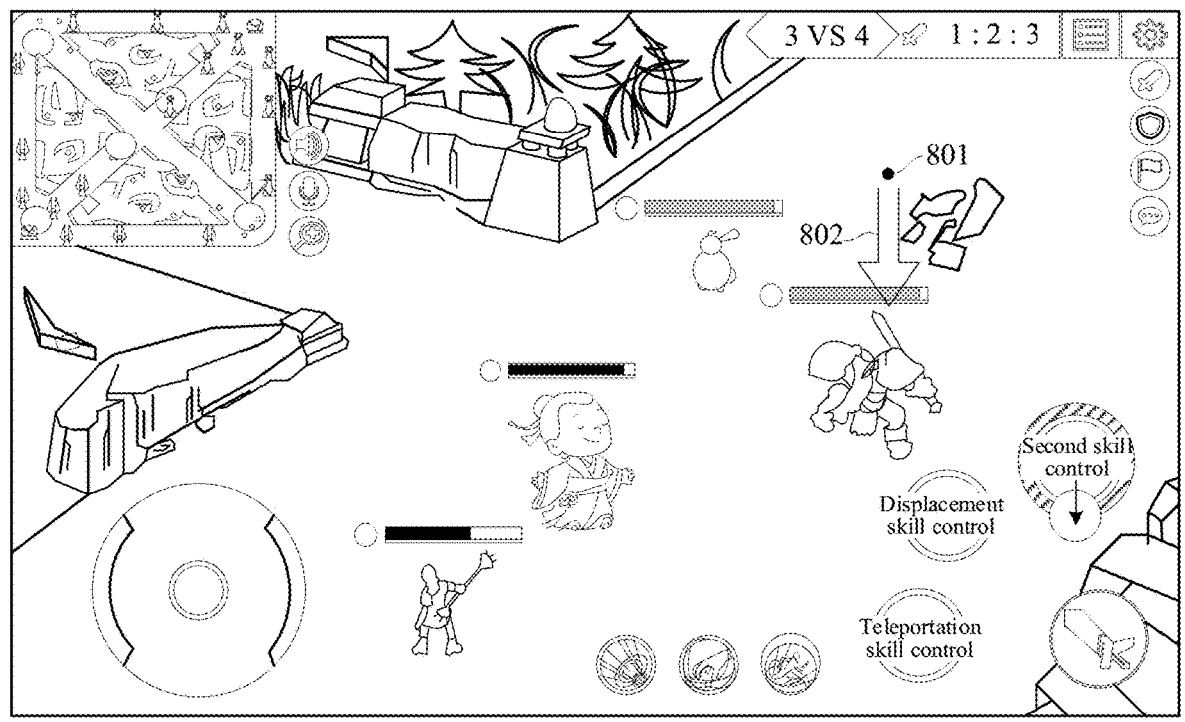
FIG. 8 is a schematic diagram showing an influence range of casting of a directional skill according to an embodiment of this application.

For example, the aiming direction determined with the second position as the starting point is determined by the user. The user determines the aiming direction by dragging the second skill control, and the terminal determines a direction toward which the second skill is aimed when the second skill control is released as the aiming direction. FIG. 8 is a schematic diagram showing an influence range of casting of a directional skill according to an embodiment of this application. In this FIG. 8, a position 801 is the second position, and an aiming direction is determined with the position 801 as a starting point. A range 802 covered by the aiming direction is determined as the influence range of casting of the directional skill.

In this case 1, a position matching the range covered by the aiming direction determined with the second position as the starting point is used as the position determined based on the second position. For example, a position where the range covered by the aiming direction determined with the second position as the starting point is located is used as the position determined based on the second position, or a boundary position of the range covered by the aiming direction determined with the second position as the starting point is used as the position determined based on the second position. In this case, the skill casting indicator of the second skill is displayed at the position matching the range covered by the aiming direction determined with the second position as the starting point.

Case 2. For the second skill being the fan-shaped skill: Display a skill casting indicator of the fan-shaped skill based on the second position in response to the second operation, an influence range indicated by the skill casting indicator of the fan-shaped skill being a fan-shaped area determined using the second position as a center of a circle and a first distance as a radius.

In one embodiment, the arc of the fan-shaped area is aimed at an aiming target, and the aiming target is any one of a second virtual object and a target position. For example, the process of determining the aiming target is as follows: when the user drags the second skill control, displaying an aiming direction based on the dragging operation of the user; with the second position as a starting point, determining a direction at which the second skill control is aimed when the user releases the second skill control as an aiming direction of the second skill; and determining a virtual object located in the aiming direction of the second skill as the aiming target, or determining a position covered by the aiming direction of the second skill as the aiming target.

In one embodiment, in response to the second skill being the fan-shaped skill and the aiming target of the second skill being the second virtual object, a skill casting indicator of the fan-shaped skill is displayed, where an influence range indicated by the skill casting indicator of the fan-shaped skill is a fan-shaped area determined using the second position as a center of a circle and a first distance as a radius, and the arc of the fan-shaped area is aimed at the second virtual object. Alternatively, in response to the second skill being the fan-shaped skill and the aiming target of the second skill being target position, a skill casting indicator of the fan-shaped skill is displayed, where an influence range indicated by the skill casting indicator of the fan-shaped skill is a fan-shaped area determined using the second position as a center of a circle and a first distance as a radius, and the arc of the fan-shaped area is aimed at the target position.

For example, the first distance is set by the application developer during development. The angle of the fan-shaped area is also set by the application developer during development. Different virtual objects may correspond to the same or different first distances and angles of the fan-shaped area, and the terminal obtains the first distance and the angle of the fan-shaped area corresponding to the first virtual object based on the object identifier of the first virtual object. For example, the first distance is 5 meters, and the angle of the fan-shaped area is 60 degrees.

Figure 9:
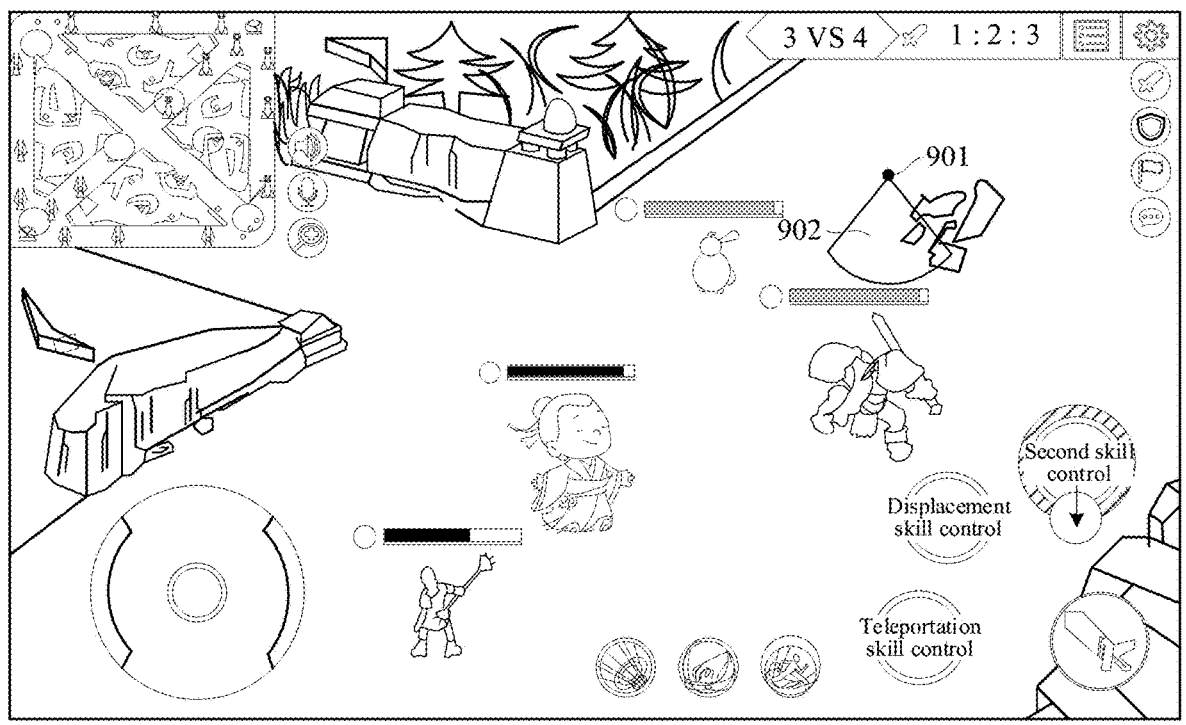
FIG. 9 is a schematic diagram showing an influence range of casting of a fan-shaped skill according to an embodiment of this application.

FIG. 9 is a schematic diagram showing an influence range of casting of a fan-shaped skill according to an embodiment of this application. In FIG. 9, a position 901 is the second position, and a fan-shaped area is determined with the position 901 as a starting point and the first distance as a radius. A range 902 corresponding to the fan-shaped area is determined as the influence range of casting of the fan-shaped skill.

In this case 2, a position matching the fan-shaped area determined with the second position as the center of a circle and the first distance as the radius is used as the position determined based on the second position. For example, a position where the fan-shaped area determined with the second position as the center of a circle and the first distance as the radius is located is used as the position determined based on the second position, or a boundary position of the fan-shaped area determined with the second position as the center of a circle and the first distance as the radius is used as the position determined based on the second position. In this case, the skill casting indicator of the second skill is displayed at the position matching the fan-shaped area determined with the second position as the center of a circle and the first distance as the radius.

Case 3. For the second skill being the circular skill: Display a skill casting indicator of the circular skill based on the second position in response to the second operation, an influence range indicated by the skill casting indicator of the circular skill being a circular area determined using a position of the aiming target as a center of a circle and a second distance as a radius.

In one embodiment, the terminal determines an aiming target of the circular skill based on the second position in response to the second skill being the circular skill, the aiming target being any one of a second virtual object and a target position. The process of determining the aiming target in this case 3 is the same as the process of determining the aiming target in the above-mentioned case 2, which will not be repeated here.

In one embodiment, in response to the second skill being the circular skill and the aiming target of the circular skill being the second virtual object, a skill casting indicator of the circular skill is displayed, where an influence range indicated by the skill casting indicator of the circular skill is a circular area determined using a position of the second virtual object as a center of a circle and the second distance as a radius.

In one embodiment, in response to the second skill being the circular skill and the aiming target of the circular skill being the target position, a skill casting indicator of the circular skill is displayed, where an influence range indicated by the skill casting indicator of the circular skill is a circular area determined using the target position as a center of a circle and the second distance as a radius.

For example, the second distance is set by the application developer during development. Different virtual objects may correspond to the same or different second distances, and the terminal obtains the second distance corresponding to the first virtual object based on the object identifier of the first virtual object. For example, the second distance is 10 meters.

Figure 10:
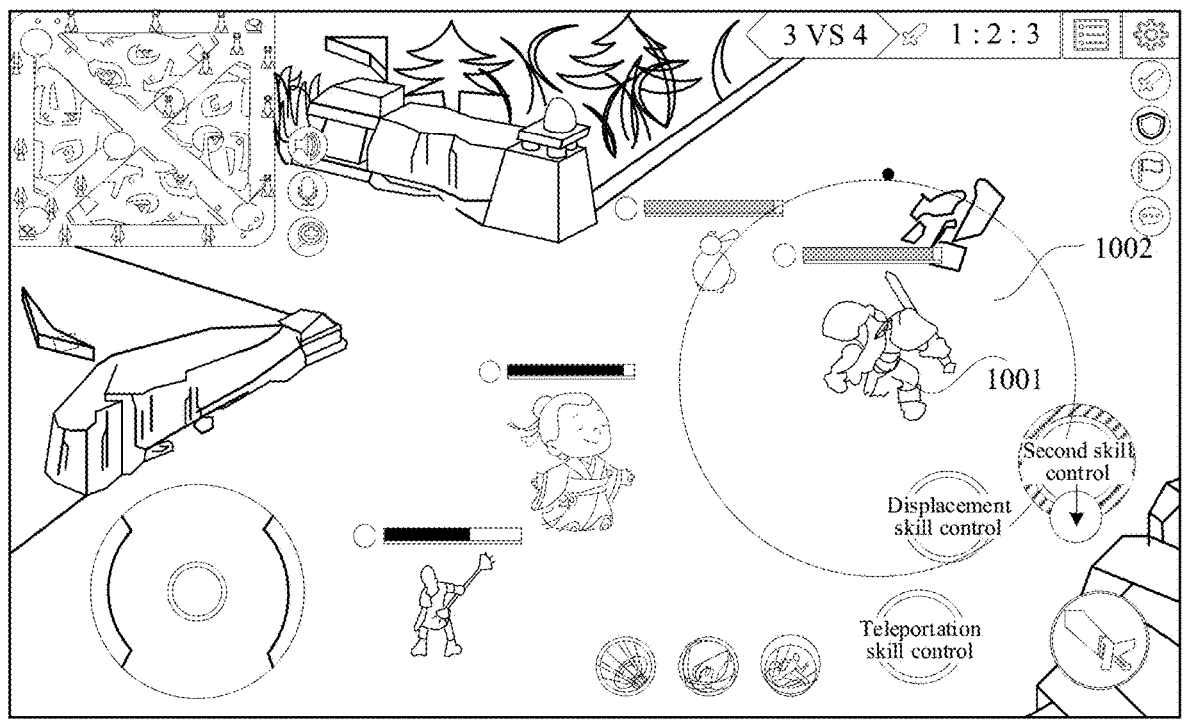
FIG. 10 is a schematic diagram showing an influence range of casting of a circular skill according to an embodiment of this application.

FIG. 10 is a schematic diagram showing an influence range of casting of a circular skill according to an embodiment of this application. In FIG. 10, a position 1001 is the position of the second virtual object, and a circular area is determined with the position 1001 as a starting point and the second distance as a radius. A range 1002 corresponding to the circular area is determined as the influence range of casting of the circular skill.

In this case 3, a position matching the circular area determined with the position of the aiming target as the center of a circle and the second distance as the radius is used as the position determined based on the second position. For example, a position where the circular area determined with the position of the aiming target as the center of a circle and the second distance as the radius is located is used as the position determined based on the second position, or a boundary position of the circular area determined with the position of the aiming target as the center of a circle and the second distance as the radius is used as the position determined based on the second position. In this case, the skill casting indicator of the second skill is displayed at the position matching the circular area determined with the position of the aiming target as the center of a circle and the second distance as the radius.

Step 204. Control the first virtual object to cast the second skill at the second position according to the influence range after the casting of the first skill by the first virtual object is complete.

Figure 11:
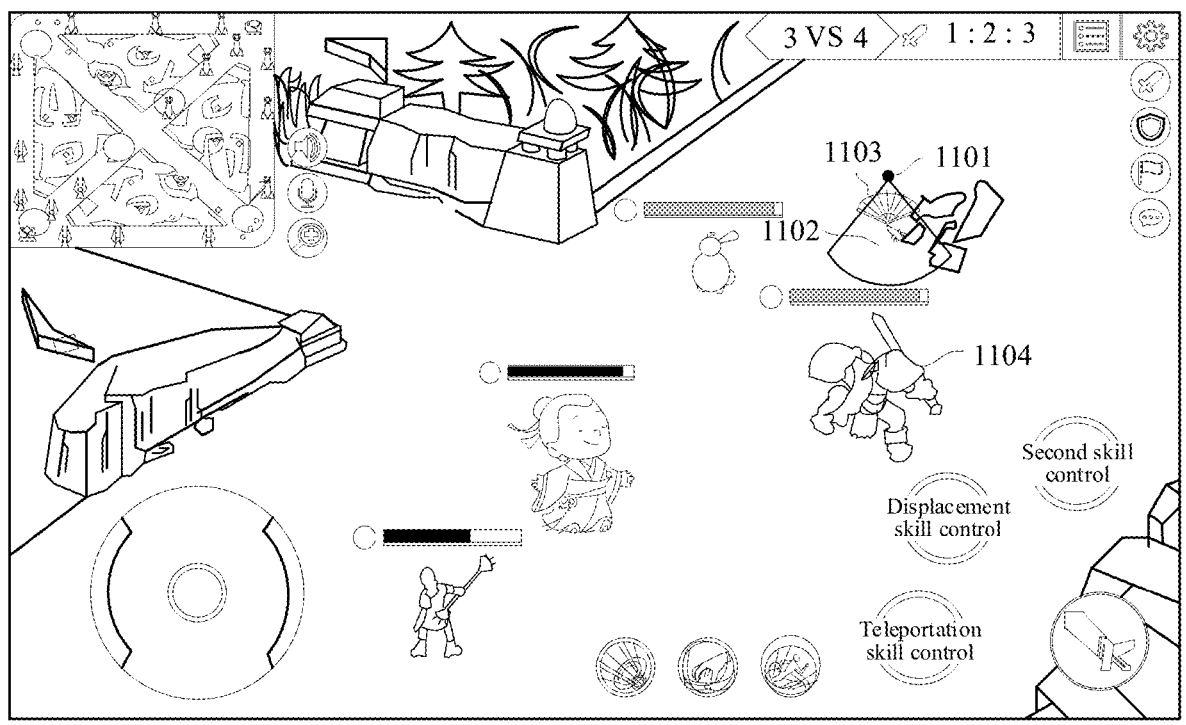
FIG. 11 is a schematic diagram of casting a second skill according to an embodiment of this application.

In one embodiment, the terminal controls the first virtual object to cast the second skill at the second position according to the influence range after the casting of the first skill by the first virtual object is complete, i.e., after the first virtual object has moved from the first position to the second position. FIG. 11 is a schematic diagram of casting a second skill according to an embodiment of this application. In FIG. 11, a first virtual object is controlled to cast a second skill 1103 at a position 1101 according to an influence range 1102, and the cast second skill 1103 can attack a second virtual object 1104. The second skill in FIG. 11 is expressed as a fan 1103. The second skill may also be expressed in other forms, which is not limited in the embodiments of this application. It can be seen from FIG. 11 that the position at which the second skill is aimed and the position at which the second skill is cast are the same position, thereby improving the accuracy of control of the first virtual object.

In one embodiment, the terminal displays the skill casting indicator of the second skill based on a third position in response to that timing of casting the second skill is not after the casting of the first skill by the first virtual object is complete, the third position being a current position of the first virtual object. The terminal controls the first virtual object to cast the second skill at the third position according to the influence range, so that the cast second skill can attack all virtual objects within the influence range. For example, the current position of the first virtual object is a position of the first virtual object when the second operation on the second skill control is obtained. The process of displaying the skill casting indicator of the second skill based on the third position is the same as the above-mentioned process of displaying the skill casting indicator of the second skill based on the second position, so the details will not be repeated here.

In the above method, after the second operation on the second skill control is obtained during casting of the first skill by the first virtual object, the skill casting indicator of the second skill is displayed based on the second position, the skill casting indicator indicating an influence range when the second skill is cast. Therefore, this method can achieve an objective of predetermining the influence range when the second skill is cast. After the casting of the first skill by the first virtual object is complete, the second skill is cast at the second position according to the influence range, so that the position at which the second skill is aimed and the position at which the second skill is cast are the same position. The second skill cast in this method can attack an object that is within the influence range, thereby improving the accuracy of control of the first virtual object.

Figure 12:
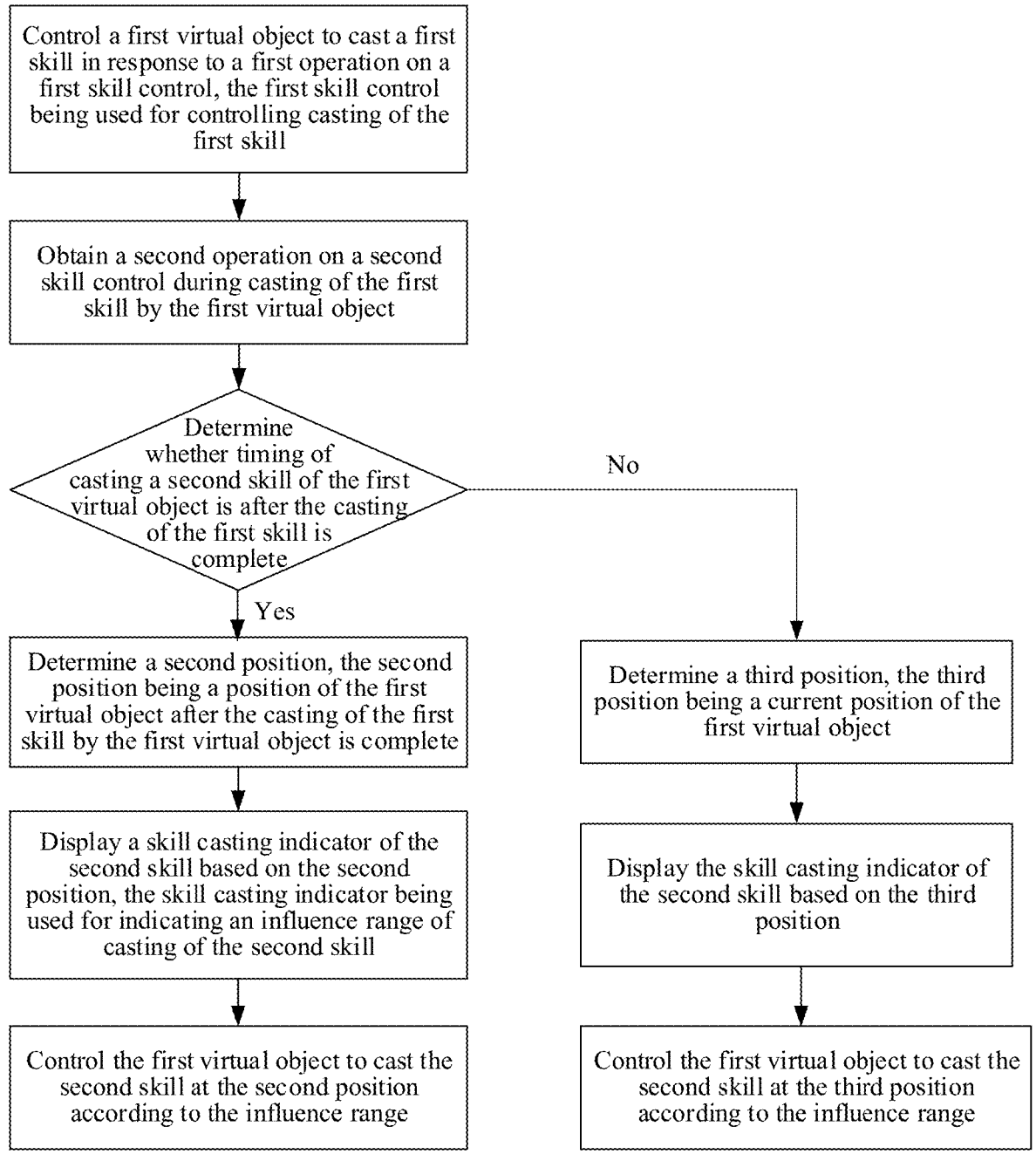
FIG. 12 is a flowchart of a virtual object control method according to an embodiment of this application.

FIG. 12 is a flowchart of a virtual object control method according to an embodiment of this application. In FIG. 12, a first operation on a first skill control is received, and a first virtual object is controlled to cast a first skill, the first skill control being used for controlling casting of the first skill. A second operation on a second skill control is obtained during casting of the first skill by the first virtual object. It is determined whether timing of casting the second skill of the first virtual object is after the casting of the first skill is complete. In response to that the timing of casting the second skill of the first virtual object is after the casting of the first skill is complete, a second position is determined, the second position being a position where the first virtual object is located after the casting of the first skill is complete.

A skill casting indicator of a second skill is displayed based on the second position in response to the second operation, the skill casting indicator indicating an influence range when the second skill is cast. The first virtual object is controlled to cast the second skill at the second position according to the influence range after the casting of the first skill by the first virtual object is complete. In response to that the timing of casting the second skill of the first virtual object is not after the casting of the first skill is complete, a third position is determined, the third position being a current position of the first virtual object. The skill casting indicator of the second skill is displayed based on the third position. The first virtual object is controlled to cast the second skill at the third position according to the influence range.

Figure 13:
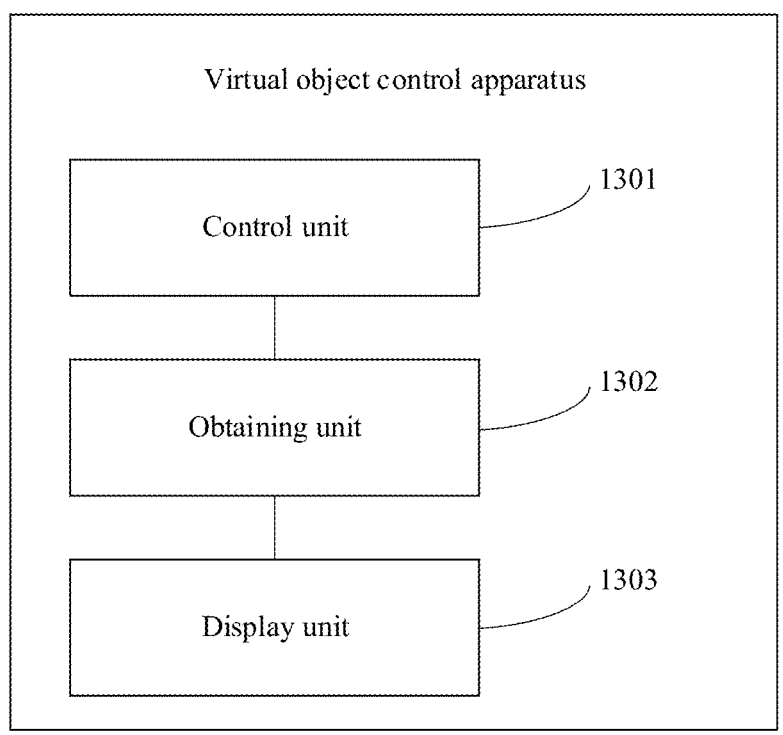
FIG. 13 is a schematic structural diagram of a virtual object control apparatus according to an embodiment of this application.

FIG. 13 is a schematic structural diagram of a virtual object control apparatus according to an embodiment of this application. As shown in FIG. 13, the apparatus includes:

a control unit 1301, configured to control a first virtual object to cast a first skill in response to a first operation on a first skill control, the first skill causing the first virtual object to move from a first position to a second position;

an obtaining unit 1302, configured to obtain a second operation on a second skill control during casting of the first skill by the first virtual object; and a display unit 1303, configured to display a skill casting indicator of a second skill based on the second position in response to the second operation, the skill casting indicator indicating an influence range when the second skill is cast, the control unit 1301 being further configured to control the first virtual object to cast the second skill at the second position according to the influence range after the casting of the first skill by the first virtual object is complete.

In one embodiment, the influence range indicated by the skill casting indicator of the second skill is determined using the second position as a reference point.

In one embodiment, the second skill includes a directional skill; and the display unit 1303 is configured to display a skill casting indicator of the directional skill based on the second position in response to the second operation, an influence range indicated by the skill casting indicator of the directional skill being a range covered by an aiming direction determined using the second position as a starting point.

In one embodiment, the second skill includes a fan-shaped skill; and the display unit 1303 is configured to display a skill casting indicator of the fan-shaped skill based on the second position in response to the second operation, an influence range indicated by the skill casting indicator of the fan-shaped skill being a fan-shaped area determined using the second position as a center of a circle and a first distance as a radius.

In one embodiment, the second skill includes a circular skill; and the display unit 1303 is configured to determine an aiming target of the circular skill based on the second position in response to the second operation, the aiming target being any one of a second virtual object and a target position; and display a skill casting indicator of the circular skill based on the second position, an influence range indicated by the skill casting indicator of the circular skill being a circular area determined using a position of the aiming target as a center of a circle and a second distance as a radius.

In one embodiment, the first skill includes a displacement skill, the first skill control includes a displacement skill control, and the displacement skill control is used for controlling casting of the displacement skill; and the control unit 1301 is configured to control the first virtual object to cast the displacement skill in response to the first operation on the displacement skill control, the second position being determined based on a type of the displacement skill.

In one embodiment, the displacement skill includes any one of an orientation skill, a target point skill, or a follow skill; and the control unit 1301 is configured to control the first virtual object to cast the orientation skill in response to the type of the displacement skill being the orientation skill, the second position being determined based on the first position and a movement distance and a movement direction corresponding to the orientation skill;

control the first virtual object to cast the target point skill in response to the type of the displacement skill being the target point skill, the second position being determined based on a first target point corresponding to the target point skill, and the target point skill being used for moving the first virtual object from the first position to the second position within a first time period and displaying a movement trajectory of the first virtual object; and control the first virtual object to cast the follow skill in response to the type of the displacement skill being the follow skill, the second position being determined based on a third virtual object followed by the first virtual object.

In one embodiment, the first skill includes a teleportation skill, the first skill control includes a teleportation skill control, and the teleportation skill control is used for controlling casting of the teleportation skill; and the control unit 1301 is configured to control the first virtual object to cast the teleportation skill in response to the first operation on the teleportation skill control, the second position being determined based on a second target point corresponding to the teleportation skill, and the teleportation skill being used for moving the first virtual object from the first position to the second position within a second time period and hiding a movement trajectory of the first virtual object.

In one embodiment, the control unit 1301 is further configured to control the first virtual object to cast the orientation skill or the target point skill in response to the type of the displacement skill being the orientation skill or the target point skill, the second position being determined based on a position of the first virtual object at a moment at which the first virtual object is blocked during the movement; or control the first virtual object to cast the orientation skill or the target point skill in response to the type of the displacement skill being the orientation skill or the target point skill, the second position being determined based on a position of a destination point to which the first virtual object is to be dragged.

In one embodiment, the display unit 1303 is configured to determine the second position in response to the second operation and that timing of casting the second skill is after the casting of the first skill by the first virtual object is complete; and display the skill casting indicator of the second skill based on the second position.

In one embodiment, the display unit 1303 is further configured to display the second position in a target form, the target form indicating that the second position is a position of the first virtual object after the casting of the first skill by the first virtual object is complete.

In one embodiment, the display unit 1303 is further configured to display the skill casting indicator of the second skill based on a third position in response to the second operation and that timing of casting the second skill is not after the casting of the first skill by the first virtual object is complete, the third position being a current position of the first virtual object.

With the above apparatus, after the second operation on the second skill control is obtained during casting of the first skill by the first virtual object, the skill casting indicator of the second skill is displayed based on the second position, the skill casting indicator indicating an influence range when the second skill is cast. Therefore, this method can achieve an objective of predetermining the influence range when the second skill is cast. After the casting of the first skill by the first virtual object is complete, the second skill is cast at the second position according to the influence range, so that the position at which the second skill is aimed and the position at which the second skill is cast are the same position. The second skill cast in this method can attack an object that is within the influence range, thereby improving the accuracy of control of the first virtual object.

It is to be understood that when the apparatus provided in FIG. 13 implements functions of the apparatus, the division of the foregoing functional units is merely an example for description. In one embodiment, the functions may be assigned to and completed by different functional units according to the requirements, that is, the internal structure of the device is divided into different functional units, to implement all or some of the functions described above. In addition, the apparatus and method embodiments provided in the foregoing embodiments belong to the same conception. For specific implementation processes, reference may be made to the method embodiments, and the details will not be described herein again.

Figure 14:
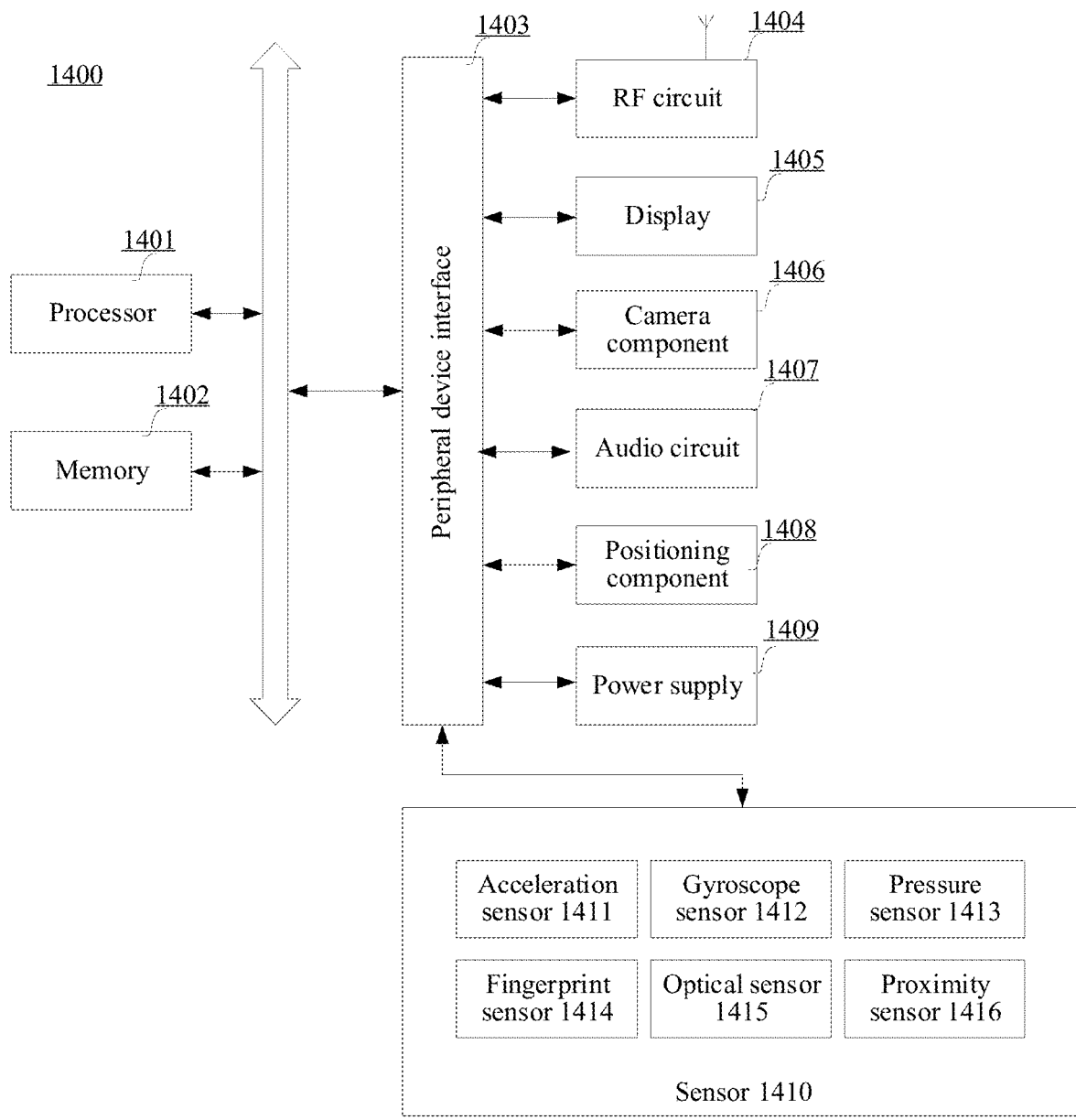
FIG. 14 is a schematic structural diagram of a terminal according to an embodiment of this application.

FIG. 14 is a structural block diagram of a terminal 1400 according to an exemplary embodiment of the present invention. The terminal 1400 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1400 may also be referred to other names such as user equipment, a portable terminal, a laptop terminal, or a desktop terminal.

Generally, the terminal 1400 includes a processor 1401 and a memory 1402.

The processor 1401 may include one or more processing cores, and may be, for example, a 4-core processor or an 8-core processor. The processor 1401 may be implemented by using at least one hardware form of a digital signal processor (DSP), a field-programmable gate array (FPGA), or a programmable logic array (PLA). The processor 1401 may alternatively include a main processor and a coprocessor. The main processor is configured to process data in an awake state, also referred to as a central processing unit (CPU). The coprocessor is a low-power processor configured to process data in a standby state. In some embodiments, the processor 1401 may be integrated with a graphics processing unit (GPU). The GPU is configured to render and draw content that needs to be displayed on a display. In some embodiments, the processor 1401 may further include an artificial intelligence (AI) processor. The AI processor is configured to process computing operations related to machine learning.

The memory 1402 may include one or more computer-readable storage media. The computer-readable storage medium may be non-transient. The memory 1402 may further include a high-speed random access memory and a non-volatile memory, for example, one or more disk storage devices or flash storage devices. In some embodiments, a non-transitory computer-readable storage medium in the memory 1402 is configured to store at least one instruction, the at least one instruction being configured to be executed by the processor 1401 to implement the virtual object control method provided in the method embodiments of this application.

In some embodiments, the terminal 1400 may further include a peripheral interface 1403 and at least one peripheral. The processor 1401, the memory 1402, and the peripheral interface 1403 may be connected by a bus or a signal line. Each peripheral may be connected to the peripheral interface 1403 by using a bus, a signal cable, or a circuit board. Specifically, the peripheral device includes at least one of a radio frequency (RF) circuit 1404, a display 1405, a camera component 1406, an audio circuit 1407, a positioning component 1408, and a power supply 1409.

The peripheral interface 1403 may be configured to connect at least one input/output (I/O)-related peripheral to the processor 1401 and the memory 1402. In some embodiments, the processor 1401, the memory 1402, and the peripheral interface 1403 are integrated on the same chip or the same circuit board. In some other embodiments, any or both of the processor 1401, the memory 1402, and the peripheral interface 1403 may be implemented on an independent chip or circuit board, which is not limited in this embodiment.

The RF circuit 1404 is configured to receive and transmit RF signals, also referred to as electromagnetic signals. The RF circuit 1404 communicates with a communication network and other communication devices by using the electromagnetic signals. The RF circuit 1404 may convert an electric signal into an electromagnetic signal for transmission, or convert a received electromagnetic signal into an electric signal. In some embodiments, the RF circuit 1404 includes: an antenna system, an RF transceiver, one or more amplifiers, a tuner, an oscillator, a digital signal processor, a codec chip set, a subscriber identity module card, and the like. The RF circuit 1404 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1404 may further include a circuit related to NFC, which is not limited in this application.

The display 1405 is configured to display a user interface (UI). The UI may include a graph, a text, an icon, a video, and any combination thereof. When the display 1405 is a touch display, the display 1405 further has a capability of acquiring a touch signal on or above a surface of the display 1405. The touch signal may be inputted to the processor 1401 as a control signal for processing. In this case, the display 1405 may be further configured to provide a virtual button and/or a virtual keyboard, which is also referred to as a soft button and/or a soft keyboard. In some embodiments, there may be one display 1405, disposed on a front panel of the terminal 1400. In some other embodiments, there may be at least two displays 1405 that are respectively disposed on different surfaces of the terminal 1400 or folded. In some other embodiments, the display 1405 may be a flexible display disposed on a curved surface or a folded surface of the terminal 1400. Even, the display 1405 may be further set to have a non-rectangular irregular pattern, that is, a special-shaped screen. The display 1405 may be prepared by using materials such as a liquid-crystal display (LCD), an organic light-emitting diode (OLED), or the like.

The camera assembly 1406 is configured to acquire an image or a video. In some embodiments, the camera component 1406 includes a front-facing camera and a rear-facing camera. Generally, the front-facing camera is disposed on a front panel of the terminal 1400, and the rear-facing camera is disposed on a rear surface of the terminal 1400. In some embodiments, there are at least two rear-facing cameras, which are each any one of a main camera, a depth-of-field camera, a wide-angle camera, or a telephoto camera, to achieve a background blurring function through fusion of the main camera and the depth-of-field camera, panoramic photographing and virtual reality (VR) photographing through fusion of the main camera and the wide-angle camera, or other fusion photographing functions. In some embodiments, the camera assembly 1406 may further include a flash. The flash may be a single color temperature flash or a double color temperature flash. The double color temperature flash refers to a combination of a warm light flash and a cold light flash, and may be used for light compensation under different color temperatures.

The audio circuit 1407 may include a microphone and a speaker. The microphone is configured to collect sound waves of users and surroundings, and convert the sound waves into electrical signals and input the signals to the processor 1401 for processing, or input the signals to the RF circuit 1404 to implement voice communication. For the purpose of stereo collection or noise reduction, there may be a plurality of microphones, respectively disposed at different portions of the terminal 1400. The microphone may be further an array microphone or an omni-directional collection type microphone. The speaker is configured to convert an electrical signal from the processor 1401 or the RF circuit 1404 into a sound wave. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1407 may also include an earphone jack.

The positioning component 1408 is configured to position a current geographic position of the terminal 1400, to implement navigation or a location-based service (LBS). The positioning component 1408 may be a positioning component based on the global positioning system (GPS) of the United States, the BeiDou System of China, and the GALILEO System of Russia.

The power supply 1409 is configured to supply power to components in the terminal 1400. The power supply 1409 may be an alternating-current power supply, a direct-current power supply, a disposable battery, or a rechargeable battery. When the power supply 1409 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1400 further includes one or more sensors 1140. The one or more sensors 1140 include, but are not limited to: an acceleration sensor 1411, a gyro sensor 1412, a pressure sensor 1413, a fingerprint sensor 1414, an optical sensor 1415, and a proximity sensor 1416.

The acceleration sensor 1411 may detect a magnitude of acceleration on three coordinate axes of a coordinate system established with the terminal 1400. For example, the acceleration sensor 1411 may be configured to detect components of gravity acceleration on the three coordinate axes. The processor 1401 may control, according to a gravity acceleration signal collected by the acceleration sensor 1411, the touch display 1405 to display the UI in a landscape view or a portrait view. The acceleration sensor 1411 may be further configured to acquire motion data of a game or a user.

The gyroscope sensor 1412 may detect a body direction and a rotation angle of the terminal 1400. The gyroscope sensor 1412 may cooperate with the acceleration sensor 1411 to acquire a 3D action by the user on the terminal 1400. The processor 1401 may implement the following functions according to data acquired by the gyroscope sensor 1412: motion sensing (for example, the UI is changed according to a tilt operation of a user), image stabilization during shooting, game control, and inertial navigation.

The pressure sensor 1413 may be disposed at a side frame of the terminal 1400 and/or a lower layer of the display 1405. When the pressure sensor 1413 is disposed at the side frame of the terminal 1400, a holding signal of the user on the terminal 1400 may be detected. The processor 1401 performs left and right hand recognition or a quick operation according to the holding signal acquired by the pressure sensor 1413. When the pressure sensor 1413 is disposed on the low layer of the display 1405, the processor 1401 controls, according to a pressure operation of the user on the display 1405, an operable control on the UI. The operable control includes at least one of a button control, a scroll-bar control, an icon control, and a menu control.

The fingerprint sensor 1414 is configured to acquire a user's fingerprint, and the processor 1401 identifies a user's identity according to the fingerprint acquired by the fingerprint sensor 1414, or the fingerprint sensor 1414 identifies a user's identity according to the acquired fingerprint. When identifying that the user's identity is a trusted identity, the processor 1401 authorizes the user to perform related sensitive operations. The sensitive operations include unlocking a screen, viewing encrypted information, downloading software, paying, changing a setting, and the like. The fingerprint sensor 1414 may be disposed on a front surface, a back surface, or a side surface of the terminal 1400. When a physical button or a vendor logo is disposed on the terminal 1400, the fingerprint sensor 1414 may be integrated with the physical button or the vendor logo.

The optical sensor 1415 is configured to acquire ambient light intensity. In an embodiment, the processor 1401 may control display luminance of the display 1405 according to the ambient light intensity collected by the optical sensor 1415. Specifically, in a case that the ambient light intensity is relatively high, the display brightness of the display 1405 is increased. In a case that the ambient light intensity is relatively low, the display brightness of the display 1405 is reduced. In another embodiment, the processor 1401 may further dynamically adjust a camera parameter of the camera component 1406 according to the ambient light intensity acquired by the optical sensor 1415.

The proximity sensor 1416, also referred to as a distance sensor, is usually disposed on the front panel of the terminal 1400. The proximity sensor 1416 is configured to acquire a distance between the user and the front surface of the terminal 1400. In an embodiment, when the proximity sensor 1416 detects that a distance between the user and the front surface of the terminal 1400 is gradually reduced, the processor 1401 controls the display 1405 to be switched from a screen-on state to a screen-off state. When the proximity sensor 1416 detects that the distance between the user and the front surface of the terminal 1400 gradually increases, the display 1405 is controlled by the processor 1401 to switch from the screen-off state to the screen-on state.

A person skilled in the art may understand that the structure shown in FIG. 14 does not constitute a limitation to the terminal 1400, and the terminal may include more or fewer components than those shown in the figure, or some components may be combined, or a different component arrangement may be used.

Figure 15:
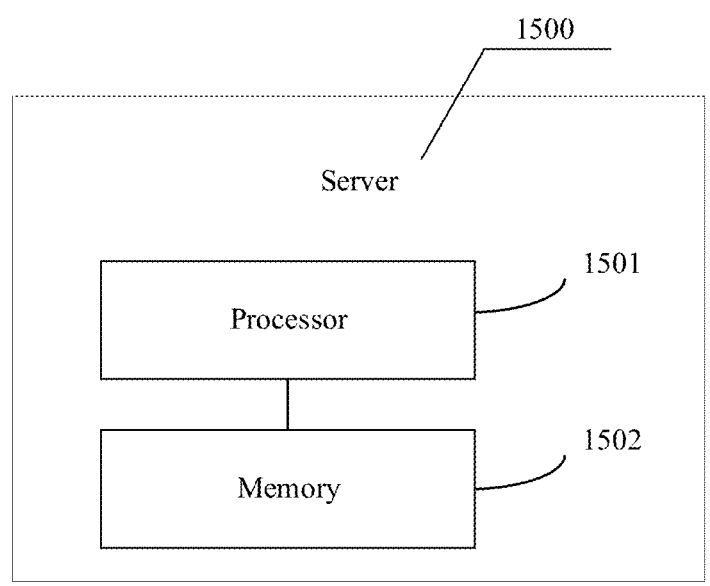
FIG. 15 is a schematic structural diagram of a server according to an embodiment of this application.

FIG. 15 is a schematic structural diagram of a server according to an embodiment of this application. The server 1500 may vary greatly because a configuration or performance varies, and may include one or more central processing units (CPU) 1501 and one or more memories 1502. The one or more memories 1502 store at least one piece of program code, and the at least one piece of program code is loaded and executed by the one or more processors 1501 to implement the virtual object control methods provided in the foregoing various method embodiments. Certainly, the server 1500 may also have a wired or wireless network interface, a keyboard, an input/output interface and other components to facilitate input/output. The server 1500 may also include other components for implementing device functions. Details are not described herein again.

In one embodiment, an electronic device is further provided, including a processor and a memory, the memory storing at least one program code, the at least program code being loaded and executed by the processor to cause the electronic device to implement the virtual object control method according to any one of the above aspects. For example, the electronic device is configured as a terminal.

In one embodiment, a non-transitory computer-readable storage medium is further provided, storing at least one program code, the at least program code being loaded and executed by a processor to cause a computer to implement the virtual object control method according to any one of the above aspects.

In some embodiments, the non-transitory computer-readable storage medium may be a read-only memory (ROM), a random access memory (random-access memory, RAM), a compact disc read-only memory (CD-ROM), a magnetic tape, a floppy disk, an optical data storage device, and the like.

In one embodiment, a computer program or computer program product is provided, storing at least one computer instruction, the at least one computer instruction being loaded and executed by a processor to cause a computer to implement the virtual object control method according to any one of the above aspects.

It is to be understood that "plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

The sequence numbers of the foregoing embodiments of this application are merely for description purpose, and are not intended to indicate the preference among the embodiments.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A virtual object control method, executed by an electronic device, the method comprising:
   controlling a first virtual object to cast a first skill in response to a first operation on a first skill control, wherein the first virtual object moves from a first position to a second position when casting the first skill;
   obtaining a second operation on a second skill control during casting of the first skill by the first virtual object and when the first virtual object is at a current position, the current position being different from the second position;
   displaying, before the first virtual object completes the casting of the first skill, a skill casting indicator of a second skill based on the second position for the second operation, the skill casting indicator indicating an influence range of the second skill, the influence range being determined using the second position as a reference point of an aiming position; and
   controlling the first virtual object to cast the second skill at the second position according to the influence range after the first virtual object completes casting of the first skill.

2. The method according to claim 1, wherein the second skill comprises a directional skill; and
   the displaying a skill casting indicator of a second skill based on the second position for to the second operation comprises:
   displaying a skill casting indicator of the directional skill based on the second position for the second operation, an influence range indicated by the skill casting indicator of the directional skill being a range of an aiming direction determined using the second position as a starting point.

3. The method according to claim 1, wherein the second skill comprises a fan-shaped skill; and
   the displaying a skill casting indicator of a second skill based on the second position for the second operation comprises:
   displaying a skill casting indicator of the fan-shaped skill based on the second position for the second operation, an influence range indicated by the skill casting indicator of the fan-shaped skill being a fan-shaped area determined using the second position as a center of a circle and a first distance as a radius.

4. The method according to claim 1, wherein the second skill comprises a circular skill; and
   the displaying a skill casting indicator of a second skill based on the second position for the second operation comprises:
   determining an aiming target of the circular skill for the second operation based on the second position, the aiming target being any one of a second virtual object and a target position; and
   displaying a skill casting indicator of the circular skill based on the second position, an influence range indicated by the skill casting indicator of the circular skill being a circular area determined using a position of the aiming target as a center of a circle and a second distance as a radius.

5. The method according to claim 1, wherein the first skill comprises a displacement skill, the first skill control comprises a displacement skill control, and the displacement skill control is used for controlling casting of the displacement skill; and the controlling a first virtual object to cast a first skill in response to a first operation on a first skill control comprises:
controlling the first virtual object to cast the displacement skill in response to the first operation on the displacement skill control, the second position being determined based on a type of the displacement skill.

6. The method according to claim 5, wherein the displacement skill comprises any one of an orientation skill, a target point skill, or a follow skill; and the controlling the first virtual object to cast the displacement skill in response to the first operation on the displacement skill control comprises:
controlling the first virtual object to cast the orientation skill in response to the type of the displacement skill being the orientation skill, the second position being determined based on the first position and a movement distance and a movement direction corresponding to the orientation skill;
controlling the first virtual object to cast the target point skill in response to the type of the displacement skill being the target point skill, the second position being determined based on a first target point corresponding to the target point skill, and moving the first virtual object from the first position to the second position within a first time period and displaying a movement trajectory of the first virtual object based on the target point skill; and
controlling the first virtual object to cast the follow skill in response to the type of the displacement skill being the follow skill, the second position being determined based on a third virtual object followed by the first virtual object.

7. The method according to claim 1, wherein the first skill comprises a teleportation skill, the first skill control comprises a teleportation skill control, and the teleportation skill control controlling casting of the teleportation skill; and the controlling a first virtual object to cast a first skill in response to a first operation on a first skill control comprises:
controlling the first virtual object to cast the teleportation skill in response to the first operation on the teleportation skill control, the second position being determined based on a second target point corresponding to the teleportation skill, and moving the first virtual object from the first position to the second position within a second time period and hiding a movement trajectory of the first virtual object based on the teleportation skill.

8. The method according to claim 6, wherein the method further comprises:
controlling the first virtual object to cast the orientation skill or the target point skill in response to the type of the displacement skill being the orientation skill or the target point skill, the second position being determined based on a position of the first virtual object at a moment at which the first virtual object is blocked during the movement; or
controlling the first virtual object to cast the orientation skill or the target point skill in response to the type of the displacement skill being the orientation skill or the target point skill, the second position being determined based on a position of a destination point of the first virtual object.

9. The method according to claim 1, wherein the displaying a skill casting indicator of a second skill based on the second position for the second operation comprises:
determining the second position for the second operation and that the second skill is cast after the first skill by the first virtual object is completely cast; and
displaying the skill casting indicator of the second skill based on the second position.

10. The method according to claim 1, wherein the method further comprises:
displaying the second position in a target form, the target form indicating that the second position is a position of the first virtual object after the first skill by the first virtual object is completely cast.

11. The method according to claim 1, wherein the method further comprises:
determining whether a timing of casting the second skill of the first virtual object is after completing the casting of the first skill;
in response to determining that the timing of casting the second skill is after completing the casting of the first skill, performing the steps of displaying, before the first virtual object completes the casting of the first skill, the skill casting indicator of the second skill based on the second position for the second operation;
in response to determining that the timing of casting the second skill is not after completing the casting of the first skill, displaying the skill casting indicator of the second skill based on the current position for the second operation.

12. A virtual object control apparatus, comprising at least one memory and at least one processor coupled to the at least one memory, the at least one processor being configured to:
controlling a first virtual object to cast a first skill in response to a first operation on a first skill control, wherein the first virtual object moves from a first position to a second position when casting the first skill;
obtaining a second operation on a second skill control during casting of the first skill by the first virtual object and when the first virtual object is at a current position, the current position being different from the second position;
displaying, before the first virtual object completes the casting of the first skill, a skill casting indicator of a second skill based on the second position for the second operation, the skill casting indicator indicating an influence range of the second skill, the influence range being determined using the second position as a reference point of an aiming position; and
controlling the first virtual object to cast the second skill at the second position according to the influence range after the first virtual object completes casting of the first skill.

13. A non-transitory computer-readable storage medium, storing at least one program code, the at least one program code being loaded and executed by at least one processor to cause a computer to implement:
controlling a first virtual object to cast a first skill in response to a first operation on a first skill control, wherein the first virtual object moves from a first position to a second position when casting the first skill;

obtaining a second operation on a second skill control during casting of the first skill by the first virtual object and when the first virtual object is at a current position, the current position being different from the second position;

displaying, before the first virtual object completes the casting of the first skill, a skill casting indicator of a second skill based on the second position for the second operation, the skill casting indicator indicating an influence range of the second skill, the influence range being determined using the second position as a reference point of an aiming position; and controlling the first virtual object to cast the second skill at the second position according to the influence range after the first virtual object completes casting of the first skill.

14. The storage medium according to claim 13, wherein the second skill comprises a directional skill; and the displaying a skill casting indicator of a second skill based on the second position for to the second operation comprises:

displaying a skill casting indicator of the directional skill based on the second position for the second operation, an influence range indicated by the skill casting indicator of the directional skill being a range of an aiming direction determined using the second position as a starting point.

15. The storage medium according to claim 13, wherein the second skill comprises a fan-shaped skill; and the displaying a skill casting indicator of a second skill based on the second position for the second operation comprises:

displaying a skill casting indicator of the fan-shaped skill based on the second position for the second operation, an influence range indicated by the skill casting indicator of the fan-shaped skill being a fan-shaped area determined using the second position as a center of a circle and a first distance as a radius.

16. The storage medium according to claim 13, wherein the second skill comprises a circular skill; and the displaying a skill casting indicator of a second skill based on the second position for the second operation comprises:

determining an aiming target of the circular skill for the second operation based on the second position, the aiming target being any one of a second virtual object and a target position; and displaying a skill casting indicator of the circular skill based on the second position, an influence range indicated by the skill casting indicator of the circular skill being a circular area determined using a position of the aiming target as a center of a circle and a second distance as a radius.

17. The storage medium according to claim 13, wherein the first skill comprises a displacement skill, the first skill control comprises a displacement skill control, and the displacement skill control is used for controlling casting of the displacement skill; and the controlling a first virtual object to cast a first skill in response to a first operation on a first skill control comprises:

controlling the first virtual object to cast the displacement skill in response to the first operation on the displacement skill control, the second position being determined based on a type of the displacement skill.

18. The storage medium according to claim 17, wherein the displacement skill comprises any one of an orientation skill, a target point skill, or a follow skill; and the controlling the first virtual object to cast the displacement skill in response to the first operation on the displacement skill control comprises:

controlling the first virtual object to cast the orientation skill in response to the type of the displacement skill being the orientation skill, the second position being determined based on the first position and a movement distance and a movement direction corresponding to the orientation skill;

controlling the first virtual object to cast the target point skill in response to the type of the displacement skill being the target point skill, the second position being determined based on a first target point corresponding to the target point skill, and moving the first virtual object from the first position to the second position within a first time period and displaying a movement trajectory of the first virtual object based on the target point skill; and controlling the first virtual object to cast the follow skill in response to the type of the displacement skill being the follow skill, the second position being determined based on a third virtual object followed by the first virtual object.

* * * * *